United States Patent
Guthery et al.

(10) Patent No.: US 9,813,366 B2
(45) Date of Patent: *Nov. 7, 2017

(54) METHOD AND SYSTEM FOR COMMUNICATING BETWEEN A SENDER AND A RECIPIENT VIA A PERSONALIZED MESSAGE INCLUDING AN AUDIO CLIP EXTRACTED FROM A PRE-EXISTING RECORDING

(71) Applicant: Rednote LLC, Milton, MA (US)

(72) Inventors: Scott Guthery, Chestnut Hill, MA (US); Richard van den Bosch, Milton, MA (US)

(73) Assignee: Rednote LLC, Milton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,677

(22) Filed: Feb. 12, 2016

(65) Prior Publication Data

US 2016/0164811 A1     Jun. 9, 2016

Related U.S. Application Data

(63) Continuation of application No. 13/356,387, filed on Jan. 23, 2012, now Pat. No. 9,262,522.
(Continued)

(51) Int. Cl.
*G10L 15/26* (2006.01)
*G06Q 30/00* (2012.01)
(Continued)

(52) U.S. Cl.
CPC .......... *H04L 51/10* (2013.01); *G06F 3/04842* (2013.01); *G06F 17/30746* (2013.01);
(Continued)

(58) Field of Classification Search
CPC ...................................................... G10L 15/26
(Continued)

(56) References Cited

U.S. PATENT DOCUMENTS

| 5,799,276 A * | 8/1998 | Komissarchik | G10L 15/04 704/207 |
| 6,950,804 B2 * | 9/2005 | Strietzel | G06Q 20/102 705/14.49 |

(Continued)

OTHER PUBLICATIONS

WIPO; International Search Report and Written Opinion issued for corresponding PCT/US2012/045302 dated Sep. 17, 2012, 8 pages.
(Continued)

*Primary Examiner* — David Hudspeth
*Assistant Examiner* — Timothy Nguyen
(74) *Attorney, Agent, or Firm* — Maier & Maier, PLLC

(57) ABSTRACT

A method of communicating between a sender and a recipient via a personalized message is disclosed comprising: (a) identifying text, via the user interface of a communication device, of a desired lyric phrase from within a pre-existing audio recording; (b) extracting audio substantially associated with the desired lyric phrase from the pre-existing recording into a desired audio clip; (c) inputting personalized text via the user interface; (d) creating the personalized message with the sender identification, the personalized text and access to the desired audio clip; (e) sending an electronic message to the electronic address of the recipient, wherein the electronic message may be an SMS/EMS/MMS message, instant message or email message including a link to the personalized message or an EMS/MMS or email message including the personalized message. An associated method of earning money from the communication along with associated systems are also disclosed.

20 Claims, 14 Drawing Sheets

Related U.S. Application Data

(60) Provisional application No. 61/503,230, filed on Jun. 30, 2011.

(51) Int. Cl.

| | | |
|---|---|---|
| *H04L 12/58* | (2006.01) | |
| *G06F 17/30* | (2006.01) | |
| *G06Q 40/00* | (2012.01) | |
| *G06F 3/0484* | (2013.01) | |
| *G06Q 20/26* | (2012.01) | |
| *G06Q 30/02* | (2012.01) | |

(52) U.S. Cl.
CPC ....... *G06F 17/30749* (2013.01); *G06Q 20/26* (2013.01); *G06Q 30/0273* (2013.01); *G06Q 40/12* (2013.12); *G10L 15/26* (2013.01); *H04L 51/04* (2013.01); *H04L 51/32* (2013.01)

(58) Field of Classification Search
USPC ........................................................ 704/235
See application file for complete search history.

(56) References Cited

U.S. PATENT DOCUMENTS

| | | | | |
|---|---|---|---|---|
| 6,968,364 | B1* | 11/2005 | Wong | H04N 5/765 348/E7.071 |
| 7,199,300 | B2* | 4/2007 | Kodama | G06F 17/30743 707/E17.101 |
| 7,973,230 | B2* | 7/2011 | Mahowald | G10H 1/368 434/307 A |
| 8,311,823 | B2* | 11/2012 | Bloebaum | G06F 17/30746 704/231 |
| 8,543,141 | B2 | 9/2013 | Meiby et al. | |
| 2002/0082059 | A1* | 6/2002 | Nariai | H04W 52/0264 455/573 |
| 2002/0120564 | A1* | 8/2002 | Strietzel | G06Q 20/102 705/40 |
| 2003/0095550 | A1* | 5/2003 | Lewis | H04L 29/06 370/392 |
| 2004/0260470 | A1* | 12/2004 | Rast | G06Q 10/06 701/300 |
| 2005/0126371 | A1* | 6/2005 | Kodama | G06F 17/30743 84/636 |
| 2005/0281541 | A1 | 12/2005 | Logan et al. | |
| 2006/0041505 | A1 | 2/2006 | Enyart | |
| 2007/0166683 | A1* | 7/2007 | Chang | G09B 5/06 434/307 R |
| 2007/0276733 | A1 | 11/2007 | Geshwind et al. | |
| 2008/0071752 | A1* | 3/2008 | Azuma | G06F 17/30864 |
| 2008/0097754 | A1* | 4/2008 | Goto | G10L 15/26 704/214 |
| 2008/0147215 | A1* | 6/2008 | Kim | G06F 17/30746 700/94 |
| 2008/0220797 | A1 | 9/2008 | Meiby et al. | |
| 2009/0012849 | A1* | 1/2009 | Penrose Barton | G06Q 30/02 705/14.19 |
| 2009/0051487 | A1* | 2/2009 | Sarig | G06F 19/3418 340/5.52 |
| 2009/0165634 | A1* | 7/2009 | Mahowald | G10H 1/368 84/610 |
| 2010/0306073 | A1* | 12/2010 | Young | G06Q 50/184 705/26.1 |
| 2011/0196726 | A1* | 8/2011 | Poellnitz | G06Q 30/02 705/14.16 |
| 2012/0004910 | A1* | 1/2012 | Quidilig | H04L 12/5835 704/235 |
| 2012/0159337 | A1* | 6/2012 | Travilla | G06Q 30/0631 715/738 |
| 2012/0221975 | A1* | 8/2012 | Juristovski | G06F 17/30026 715/823 |
| 2014/0344956 | A1* | 11/2014 | Garben | G06F 21/10 726/30 |

OTHER PUBLICATIONS

WIPO; International Preliminary Report on Patentability for corresponding PCT/US2012/045302 dated Mar. 25, 2014, 7 pages.

* cited by examiner

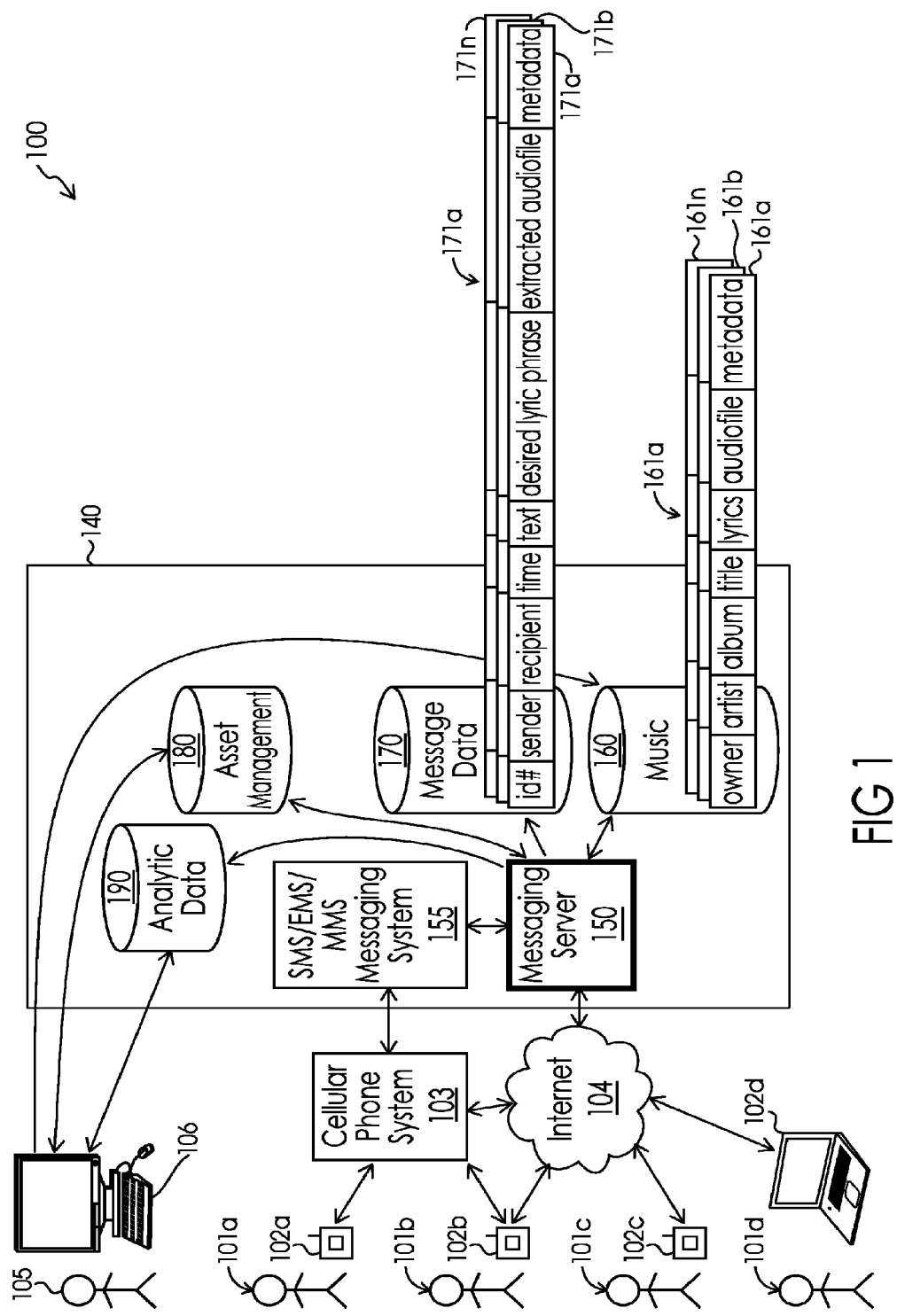

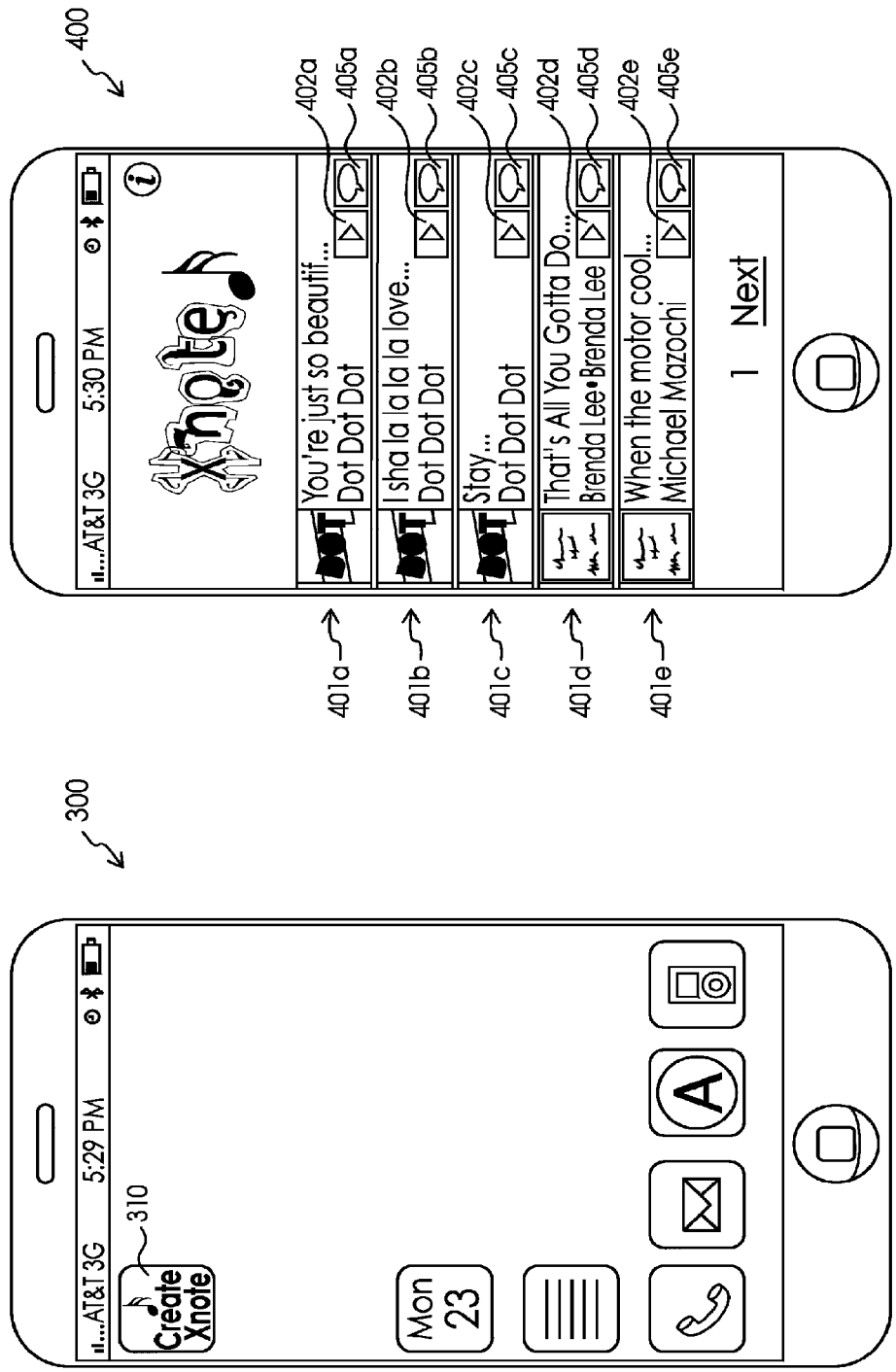

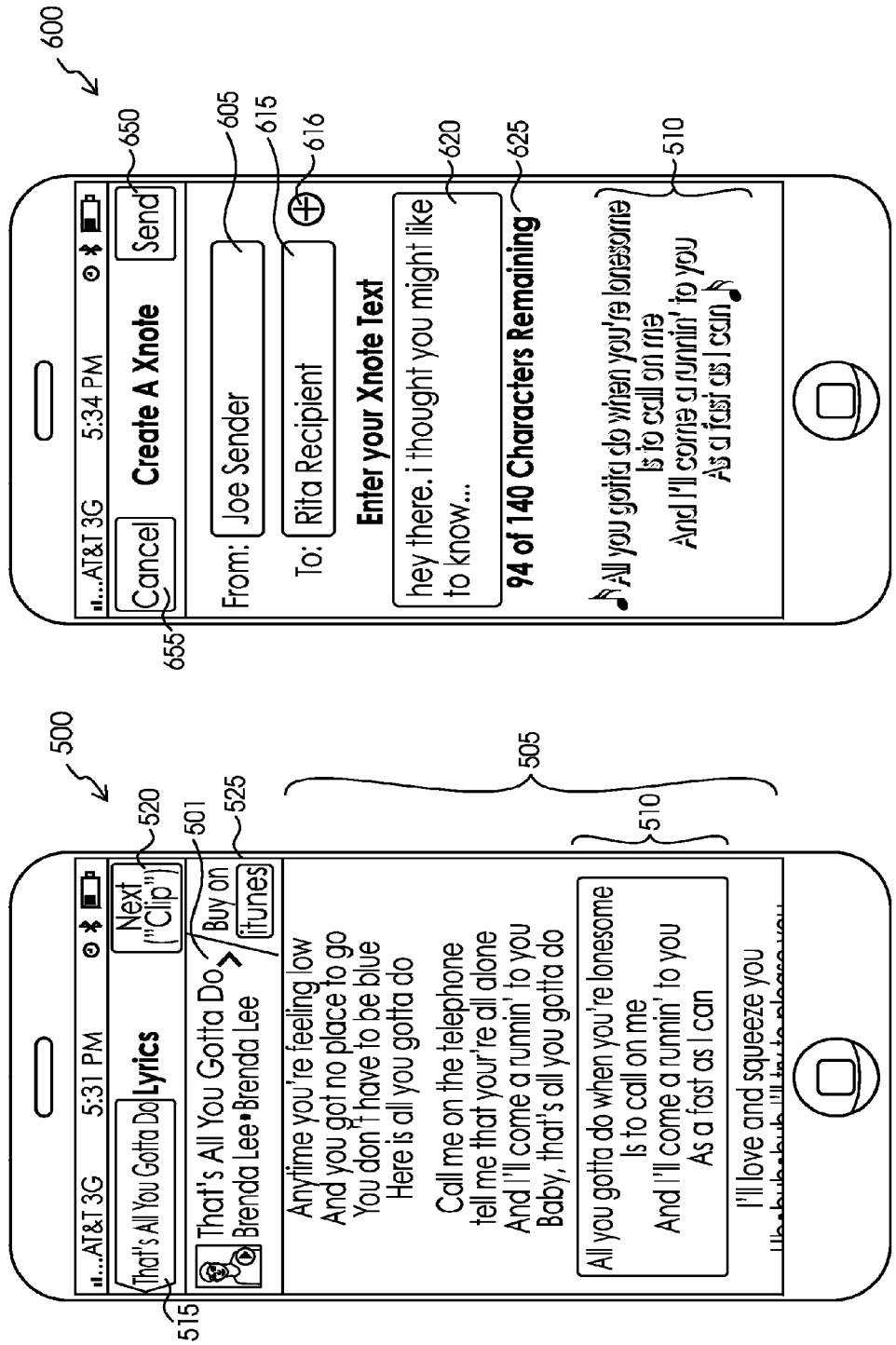

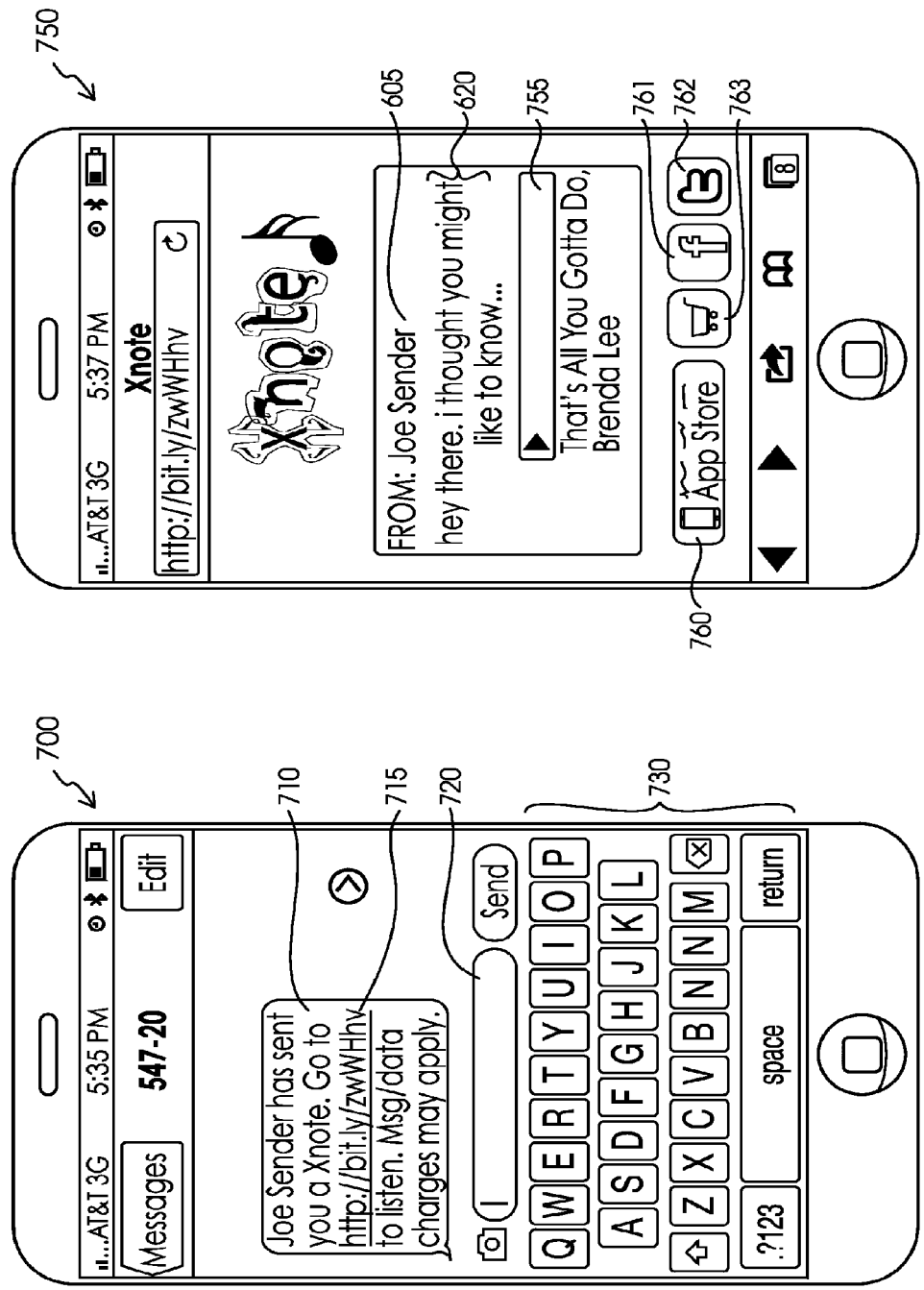

METHOD AND SYSTEM FOR COMMUNICATING BETWEEN A SENDER AND A RECIPIENT VIA A PERSONALIZED MESSAGE INCLUDING AN AUDIO CLIP EXTRACTED FROM A PRE-EXISTING RECORDING

CROSS-REFERENCE TO RELATED APPLICATIONS

This application is a continuation of U.S. patent application Ser. No. 13/356,387, filed Jan. 23, 2012 and entitled "Method and System for Communicating Between a Sender and a Recipient via a Personalized Message Including an Audio Clip Extracted from a Pre-Existing Recording," which claims priority from U.S. Provisional Patent Application No. 61/503,230, filed on Jun. 30, 2011, entitled "Locating a Lyric Phrase in a Digital Music Recording," the entire contents of which are hereby incorporated by reference.

FIELD OF THE INVENTION

The present invention relates generally to interaction with digital audio, and more particularly to a method and system for communicating between a sender and a recipient via a personalized message including an audio clip associated with a desired lyric phrase extracted from a pre-existing recording as well as the associated method and system for locating the portion of the audio file containing the desired lyric and creating a digital file from that segment.

DESCRIPTION OF THE RELATED ART

Consumers are purchasing digital music and products to augment their digital music libraries at unprecedented rates. A combination of better music management and evolving digital rights management has created an environment where more music than ever is available legally, and creative tools to use that music are easily accessible.

An emotion may be felt by one individual toward another or it can be shared between two or more individuals. For many reasons, recordings may encapsulate many emotions. For example, the recording of an opera may contain emotions of the various roles in the opera. Expressing an emotion by singing a song can be traced back at least to the troubadours of the High Middle Ages (1100-1350). Song lyrics are crafted to describe a human emotion in a succinct and precise manner. The music encapsulating an emotive lyric shades and intensifies the description. The analog of the troubadour in the modern age is to communicate the emotion by sending a recording of the song encapsulating the emotion. However, the market offerings for creating a snippet of song that represents a particular emotion or set of feelings are scarce. Existing services have categorized a limited number of audio files harvested from various public Internet sites. Often the harvested files do not include the entire original work. Frequently, the harvested files were unlicensed copies themselves and many times the audio quality is poor. Thus, there is a need for a service that can provide access to licensed audio that allows for the clipping of that audio into licensed clips, so that users and providers associated with these transactions are not in violation of copyright laws. Involvement with an unlicensed system could damage the businesses reputation and that of any sponsors. Existing services require that a user listen to the entire audio file (or prior users' previously created clips) to determine a clip start and stop time for a portion of the song they wish to clip. There have long been means and methods for a human operator to examine a digital recording and to clip a pre-specified lyric phrase out of the recording. There are, for example, recording studios that contain hardware devices for the editing of recorded music including listening to the music and clipping out certain segments of recordings. There are also software programs that enable the user to listen to digitally recorded music on a home computer and to clip out segments from digital media. Many of these options require access to specialized hardware and/or software and may further require the user to possess the expertise to operate the hardware and/or software to achieve the desired result. The few generally available options are cumbersome, which makes creating the audio clips time-consuming and difficult, particularly for novice users.

There is a need in the art to provide users with a way to find the specific feeling they are looking to express from within the music. There is an associated need to provide selectable lyrics that may be preferably searchable. There is a further desire to provide potentially easier alternatives to quickly locate a desired portion of a song.

Accordingly there is a need for a system that would provide even novice users the functionality to identify a recording containing a desired lyric phrase, get a clip of that lyric phrase and facilitate the transmission of that audio clip via email, text, IM or other means of electronic-particularly one-to-one (or peer-to-peer) communication as opposed to one-to-many sites that allow users to post song segments that are meaningful to them.

Mobile phone use and music consumption and involvement show a concrete connection that has experienced rapid growth much along the lines of mobile messaging services. A 2010 Pew Research study indicated that 33% of mobile subscribers use their phone for music—that number is 3% more than those who use instant messaging and 4% more than application use. Consumers will come to know and expect richer communication experiences from their smartphones. Thus, there is an opportunity to leverage this mobile phone usage for musical playback and messaging.

Many e-greeting services have already taken advantage of increasing mobile internet use. Industry experts predict that mobile greetings including unique services for youth, dating and special interests will generate over $100 M in revenue between 2010 and 2013. However, none of these e-greeting services have filled the needs noted above.

SUMMARY OF THE DISCLOSURE

The present disclosure teaches various inventions that address, in part (or in whole) these and other various desires in the art. Those of ordinary skill in the art to which the inventions pertain, having the present disclosure before them will also come to realize that the inventions disclosed herein may address needs not explicitly identified in the present application. Those skilled in the art may also recognize that the principles disclosed may be applied to a wide variety of techniques involving communications, marketing, reward systems, and social networking.

First, approaching the present invention at a high, more consumer-oriented level, imagine that an end user (a sender) using their smartphone could select and then clip a line or two from their favorite pre-existing song or other pre-existing recording and send it electronically to a friend to let them know how the sender is feeling at that moment. These "snippets" of songs may typically last less than 19 seconds (but may range from one second to 29 seconds and even longer) and can be thought of as a "musical emoticon" . . . a way to send thoughts and feelings.

The audio "snippet" may be sent to a recipient's text, chat, or email conversation via mobile phone, tablet device, or computer. In one embodiment, an end user receives a custom message (which may be using a short code (e.g. 547-20)) telling them that their friend has sent them a message with an audio clip. In one approach, a link is included in the message; when the end user clicks on the link they are taken to a system landing page where they will see their friend's personalized message and play the audio clip. The recipient may then be provided with the option of sharing the audio clip with other friends, purchasing the entire song, or going to the system website to learn more about the artist. In IM Chat and email conversations, users simply click on the link to arrive at the system landing page. The recipient of the audio clip may click on a link to be connected to a streaming server that takes the recipient to a landing page that displays a custom message sent by their friend and play the brief audio clip created by the friend.

In one approach an Application Programming Interface (API) may be used to integrate the inventive method and system with preexisting music catalog software (e.g. iTunes, Rhapsody, Pandora). The API catalogs, constructs and delivers a short portion of a song that is relevant to a consumer's electronic communication with a friend. The API offers a live data gathering approach to collect and sanitize current music offerings from a variety of catalogs and repositories.

In some approaches, a central clearinghouse may be used to organize the sampling of each pre-existing song to create an audio database for the system as well as the purchasing opportunities for a particular full version of the song. The system and method may also include analytics, digital rights management and purchasing flows. Among other things, streaming technology allows the system to fully account for each streamed snippet while minimizing, if not removing, the threat of piracy.

In a system intended to support this transmission of musical emoticons, the pre-existing recordings may be identified by any number of attributes including, but not limited to, the artist, title, musical genre, speed, lyrics, as well as other variables, which may be included, for instance, in metadata.

To this end, the present disclosure teaches, among other things, a method of communicating between a sender and a recipient via a personalized message created by the sender on a communication device. The method comprises identifying text, via a user interface on the communication device, of a desired lyric phrase from within a pre-existing recording; extracting the audio substantially associated with the desired lyric phrase from the pre-existing recording into a desired audio clip via a substantially automated process; providing an electronic address for the recipient; inputting personalized text via the user interface; creating the personalized message with the sender identification, the personalized text and access to the desired audio clip; and sending an electronic message to the electronic address of the recipient. The sent electronic message may be an SMS/EMS/MMS/IM or email message including a link to the personalized message or an EMS/MMS or email message comprised of the personalized message, itself Creating the personalized message may further include saving the desired audio clip in a storage facility not controlled by either the sender or the recipient; and providing a handle to the desired audio clip in the personalized message.

The method may further include creating an account for the sender; associating the sender account with funds; and deducting from the funds associated with the sender account upon the occurrence of a predetermined event. The predetermined event may be sending the electronic message; the recipient accessing the handle of the audio snippet; or even the successful receipt of the electronic message. The amount of funds/credits deducted from the sender account may be based upon who the publisher/owner/controlling agent is of the pre-existing recording.

Where sending the electronic message is controlled by an administrator and the pre-existing recording is controlled by a publisher, creating the personalized message may further include providing a link to a web page controlled by the publisher that offers the pre-existing recording; and associating the link with the administrator so that the publisher pays the administrator if the recipient purchases the pre-existing recording from the web page.

Identifying text may require the sender to search for the desired lyric phrase within one or more pre-existing recordings. The lyrics may be generated for use in the system using a speech-to-text conversion program on the pre-existing recording. The method may include means to assist the sender in searching such as means for selecting an emotion from a list of possible emotions; and displaying the one or more pre-existing recordings pre-associated with the selected emotion. The method may include other search aids such as playing back at least a portion of one or more pre-existing recordings via the user interface. Where extracting the audio substantially associated with the desired lyric phrase was used to further create lyrics synchronized to the pre-existing recording, playing back the portion of one or more pre-existing recordings may include displaying lyrics associated with the portion of the one or more pre-existing recordings on the user interface.

The substantially automated process for extracting audio substantially associated with the desired lyric phrase from the pre-existing recording into the desired audio clip may include: applying the adjusted best-suited wavelet template to the pre-existing recording to form a time-by-frequency matrix; detecting vocal/non-vocal edges in the time-by-frequency matrix; establishing vocal intervals based on the detected edges; mapping lyrics for the pre-existing recording onto the established vocal intervals; and extracting the desired audio clip by matching the desired lyric phrase to one of the established vocal intervals based on the mapping. This extraction method may further include analyzing the pre-existing recording to select the best-suited wavelet template for the pre-existing recording; and adjusting the parameters of the best-suited wavelet template.

The invention may further include a system for communicating between a sender and a recipient via a personalized message created by the sender via a communication device. The system including a music database containing a plurality of pre-existing recordings; a sender user interface in operable communication with the communication device, capable of displaying the plurality of pre-existing recordings in the music database and lyrics associated with each of the plurality of pre-existing recordings, the sender user interface supporting (a) identification by the sender of a desired lyric phrase found within one of the plurality of pre-existing recordings, (b) entry of an electronic address of the recipient and (c) entry of a personalized text; an audio extraction engine operably associated with the music database and the sender user interface to extract audio substantially associated with the desired lyric phrase found within one of the plurality of pre-existing recordings into a desired audio clip; and a message generator for generating the personalized message including the sender identification, the personalized text and access to the desired audio clip and for saving the personalized message in a message database. The electronic message may be an SMS/EMS/MMS/IM or email message including a link to the personalized message or an EMS/MMS or email message comprised of the personalized message.

The audio extraction engine may use a time-by-frequency matrix to detect vocal/non-vocal edges and thus establish likely vocal intervals, maps lyrics for the pre-existing recording onto the established likely vocal intervals and then extracts the desired audio clip by matching the desired lyric phrase to one of the established vocal intervals based on the mapping.

The system may further include an asset management database containing a sender account for each sender, each sender account being associated with funds. The asset management database may further contain accounts for one or more sponsors, each sponsor account including a sponsor brand image and sponsor allocated funds, wherein the funds associated with each sender account are the sponsor allocated funds.

The system may also include an analytic engine for monitoring events generated by at least one of the sender user interface, the message generator, the recipient user interface. Among other things, the analytic engine may determine whether a predetermined event has occurred, which could be sending an electronic message to a recipient; the successful receipt of the electronic message by the recipient; or the recipient accessing the desired audio clip.

The sender user interface may support searching for the desired lyric phrase within the plurality of pre-existing recordings in the music database. That search interface may support searching for the desired lyric phrase by providing an interface that facilitates the selection of an emotion from a list of possible emotions and then displays one or more pre-existing recordings pre-associated with the selected emotion.

These and other advantages and uses of the present system and associated methods will become clear to those of ordinary skill in the art after reviewing the present specification, drawings, and claims.

BRIEF DESCRIPTION OF THE FIGURES

For a better understanding of the present disclosure, non-limiting and non-exhaustive embodiments are described in reference to the following drawings. In the drawings, like reference numerals refer to like parts through all the various figures unless otherwise specified.

FIG. 1 illustrates one embodiment of a system 100 that may be utilized accordance with one or more potential approaches to the present invention.

FIG. 3 illustrates one potential aspect of the deployment of the system 100 on one particularly illustrative smartphone-based user interface depicting, in particular, a launch icon (among other icons) to start the messaging process.

FIG. 4 illustrates one potential aspect of the deployment of the system 100 on one particularly illustrative smartphone-based user interface depicting, in particular, a user interface for browsing pre-existing recordings.

FIG. 5 illustrates one potential aspect of the deployment of the system 100 on one particularly illustrative smartphone-based user interface depicting, in particular, a user interface for identifying text of a desired lyric phrase from a pre-existing recording to facilitate extraction of the desired audio snippet from the pre-existing recording.

FIG. 6 illustrates one potential aspect of the deployment of the system 100 on one particularly illustrative smartphone-based user interface depicting, in particular, a user interface for inputting personalized text to be included in the personalized message.

FIG. 7 illustrates the receipt by the recipient on an illustrative communication device (i.e. smartphone) of an electronic message including a link to the personalized message created by the sender as automatically created and sent by system 100 in the form of a text (e.g. SMS/EMS/MMS) message.

FIG. 7A illustrates the state of the recipient's illustrative communication device (i.e. smartphone) after clicking on the link in the electronic message automatically created and sent by system 100 in the form of a text (e.g. SMS/EMS/MMS) message as illustrated in FIG. 7, depicting the personalized message created by the sender as generated in association with the recipient user interface of messaging server 150 of FIG. 1.

Figure 1A:
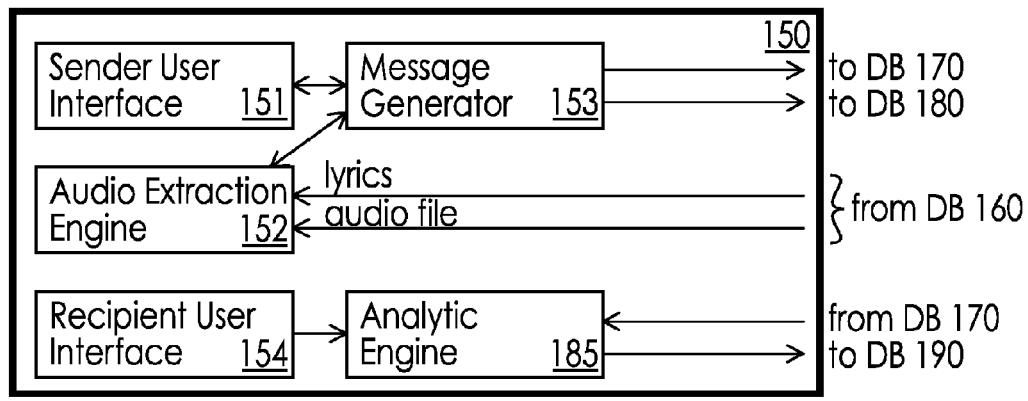
FIG. 1A illustrates one potential embodiment of the messaging server 150 illustrated in the system 100 of FIG. 1.

Persons of ordinary skill in the art will appreciate that elements in the figures are illustrated for simplicity and clarity so not all connections and options have been shown to avoid obscuring the inventive aspects. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

FIG. 1 illustrates one embodiment of system 100 that may be utilized accordance with one or more potential approaches to the present invention and its potential avenues for interaction with the real world toward implementing the concepts of the present invention. The system and associated methods perform the creation, management, selection and delivery of segments of digital music files. System 100 also facilitates communications between people 101 *a*, 101 *b*, 101 *c* and 101 *d* who may be senders, receivers, or both in the context of the system 100. People 101 *a*, 101 *b*, 101 *c* and 101 *d* may communicate via a variety of communication devices 102 *a*, 102 *b*, 102 *c*, and 102 *d*, respectively, via the cellular phone system 103 and/or the Internet 104.

Communication Devices 102

The present invention provides a system and method that can be utilized with a variety of different communication devices 102, including but not limited to PDA's, cellular phones, smart phones, laptops, tablet computers, and other mobile devices that include cellular voice and data service as well as preferable access to consumer downloadable applications. One such communication device could be an iPhone, Motorola RAZR or DROID; however, the present invention is preferably platform and device independent. In fact, ebook readers that provide web access (e.g. the Kindle (from Amazon.com) and the Nook (from Barnes & Noble)) may also be used as the communication device 102. The communication device technology platform may be Microsoft Windows Mobile, Microsoft Windows Phone 7, Palm OS, RIM Blackberry OS, Apple iOS, Android OS, Symbian, Java, Linux, or any other technology platform. For purposes of this disclosure, the present invention has been generally described in accordance with features and interfaces that are optimized for a smartphone utilizing a generalized platform, although one skilled in the art would understand that all such features and interfaces may also be used and adapted for any other platform and/or device.

The communication device 102 further includes a user interface that provides some means for the consumer to receive information as well as to input information or otherwise respond to the received information. As is presently understood (without intending to limit the present disclosure thereto) this user interface may include a microphone, an audio speaker, a haptic interface, a graphical display, and a keypad, keyboard, pointing device and/or touch screen. The communication device 102 will also include a processor and memory. The memory may include ROM, RAM as well as one or more removable memory cards. The memory provides storage for computer readable instructions and other data, including a basic input/output system ("BIOS") and an operating system for controlling the operation of the communication device. The communication device will also include a device identification memory dedicated to identify the device, such as a SIM card, that uniquely identifies the device. Although the specification may focus on the communication device 102 being a smartphone, it should be understood by those of ordinary skill in the art having the present specification, drawings, and claims before them that this is simply for ease of explanation and not intended to limit the present invention to any smartphone embodiment.

One envisioned mode of delivery is via communication devices that do not contain any system-specific applications. In this delivery mode, the system will be received, managed and played using software indigenous to a stock mobile telephone. In most instances, this approach would mean that the system would then be encoded as a standard-compliant multimedia messaging service (MMS) message. However, it is contemplated that native email programs available on many stock mobile telephones will be used in conjunction with the system. It is also contemplated that web-based email programs could be used.

Even where the communication devices contain a system application, that application will necessarily rely on much of the device's indigenous software to handle the system. For instance, indigenous software will always be responsible for receiving the audio snippet from the server and for playing back the audio snippet through the mobile telephone's audio subsystem.

Furthermore, standards-compliant means in the mobile telephone will be used to encode and enforce the security policy associated with the system 100.

Cellular Telephone System 103 and Internet 104

The communication device 102 also preferably includes a mobile network interface to establish and manage wireless communications with the cellular telephone system 103. The cellular telephone system 103 uses one or more communication protocols and technologies including, but not limited to, global system for mobile communication (GSM), 3G, 4G, code division multiple access (CDMA), time division multiple access (TDMA), user datagram protocol (UDP), transmission control protocol/Internet protocol (TCP/IP), general packet radio service (GPRS), WAP, ultra wide band (UWB), IEEE 802.16 Worldwide Interoperability for Microwave Access (WiMax), SIP/RTP, or any of a variety of other wireless communication protocols to communicate with the mobile network of a mobile network operator. Accordingly, the mobile network interface may include as a transceiver, transceiving device, or network interface card (NIC).

To facilitate the use and bi-directional transmission of data between the server 140 and the communication devices 102, the cellular telephone system 103 is preferably operably connected to the Internet 104. In fact, Internet 104 may comprise the Internet, WAN, LAN, Wi-Fi, or other computer network (now known or invented in the future). It should be understood by those of ordinary skill in the art having the present specification, drawings, and claims before them that the communication devices 102 may be operably connected to the server over any combination of wired and wireless conduits, including copper, fiber optic, microwaves, and other forms of radio frequency, electrical and/or optical communication techniques. As will be discussed more fully herein below, many of the communications conducted via system 100 may be SMS (short message service), EMS (enhanced message service), MMS (multimedia message service), instant messaging, email messaging and other types of messaging that are or may become available for use in association with communication devices 102.

Server 140, Messaging Server 150 and Databases 160, 170, 180 and 190

As shown in FIG. 1, server 140 comprises messaging server 150, SMS/EMS/MMS messaging system 155, music database 160, message database 170, asset management database 180, and analytic database 190. Although this illustration will serve to explain the aspects of the present invention well, as might be expected, there may be a substantial amount of overlap between subsystems and process elements, such that functionality may be moved between subsystems and process elements reorganized while still maintaining the spirit of the present invention. An administrator 105 may access the server 140 via computer 106 (which computer 106 may also comprise a communication device 102). As further illustrated in FIG. 1A, messaging server 150 comprises the sender user interface 151, the audio extraction engine 152, the message generator 153, the recipient user interface 154, and analytic engine 185. As would be understood by those of ordinary skill in the art having the present specification, drawings, and claims before them, each of the sender user interface, the audio extraction engine, the message generator, the recipient user interface, and analytic engine may be implemented as software running on a variety of processor written in any of a variety of computer languages, however, these subsystems may also be fully or partially implemented in hardware or firmware using a variety of techniques that are well-known in the art. FIG. 1A also illustrates many of the significant connections between the databases 160, 170, 180 and 190 and the subsystems of the messaging server 150.

While the databases 160, 170, 180 and 190 are each depicted as a single database, it should be understood by those of ordinary skill in the art having the present specification, drawings, and claims before them that the any and all of the databases 160, 170, 180 and 190 may be stored in multiple locations and across multiple pieces of hardware, including but not limited to storage in the cloud (i.e. a set of virtual storage areas and systems that expand and contract with use without requiring the manual provisioning or deprovisioning of physical hardware by the administrator). In view of the sensitivity and/or commercial significance of most of the data stored in the databases they are preferably secured in an attempt to minimize the risk of undesired disclosure of viewer information to third parties. The databases may be standard relational database systems such as those available from Oracle, which are widely used to organize media files.

Figure 1B:
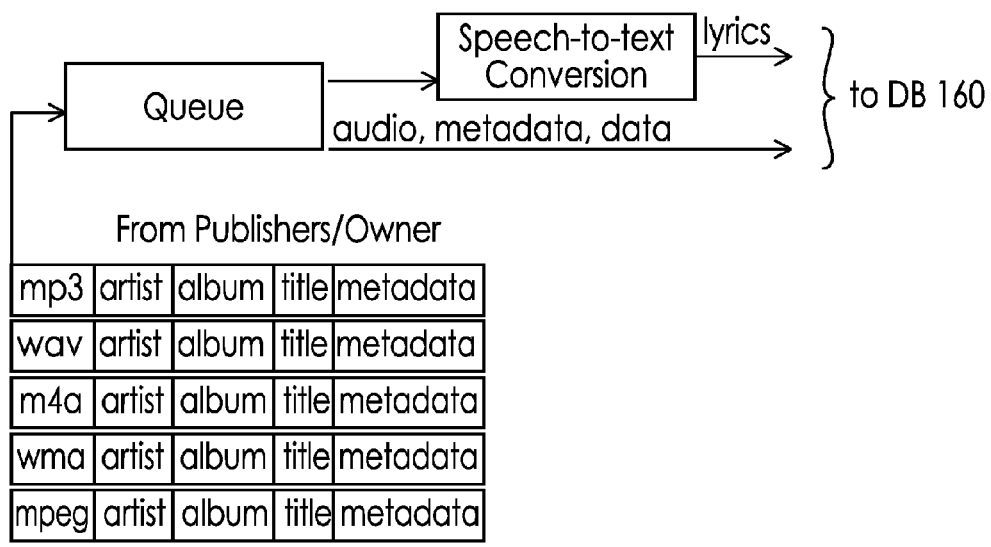
FIG. 1B illustrates one potential embodiment of a subsystem to ingest pre-existing recordings into the system 100.

As further illustrated in FIG. 1, music database 160 contains records 161 a, 161 b, . . . 161 n associated with a plurality of pre-existing recordings (or audiofiles). These records may be created by the subsystem/process illustrated in FIG. 1B to ingest pre-existing recordings into the system 100. In particular, one or more owners/publishers of pre-existing recordings (such as Rhapsody, Pandora, and iTunes) may send audio files in a variety of formats (including but not limited to mp3, way, m4a, wma, mpeg) along with artist, album, and title information, as well as metadata. Metadata is information about the media file and typically this information is particular to how the media database is to be used. For example, metadata for the iTunes recorded music database would include the name of a song and the name of the performer since this information is what Apple's customers wish to use to access the database. Indexing is the way metadata is processed to find a particular entry in the database.

Because of the ability to provide publishers/owners of pre-existing recordings with income from even small portions of the recordings in their catalogs as well as the security provided for the pre-existing recordings, the system will leverage licensing deals with various catalogs of music to scan and index their libraries of pre-existing recordings dynamically. To optimize revenue for the publishers/owners, partners of the system will take each music catalog that is scanned and indexed and assigned a preferred purchasing method for the full track song in music records 161. Some catalogs may have current deals with iTunes or Amazon while others may allow for independent payment acceptance. However, the system is purchasing availability agnostic, meaning that the optimum route to purchase for a particular full track song is dynamically assigned at the time of indexing and can change as many times as the music catalog holder desires. The system will ingest any incentive data that is offered by the music label. Special offers, pre-purchase deals and more will be added to the master library and passed on to the users. Purchases that utilize an incentive offer will be easily tracked using the system reporting systems as well as the unique offer ID that accompanies each sale event at participating purchase partners (iTunes, Amazon etc.).

As shown in FIG. 1B, the pre-existing recordings are queued up and—to the extent the publisher/owner of the pre-existing recording does not provide the text of the associated lyrics—the pre-existing recording may be fed to a speech-to-text conversion engine (such as the commercial available speech-to-text engines sold by Nuance Communication), so as to create a lyric file from the pre-existing audio recording. The generated lyrics, audio file, data (e.g. artist, album, title), and metadata may be saved into music database 160 in a unique record 161. It is contemplated that the lyrics could be generated on-the-fly when a person indicates potential interested in a particular pre-existing recording so as to economize on the storage size of music database 160. However, the potential real-time performance problems (or conversely the need for expensive processor power) that could be created by dynamic lyric creation may make this approach less desirable.

As any audio files or snippet must be played back using hardware and software found in existing communications devices 102, the encoding of the audio clips should comply with existing standards and formats. It is contemplated that the audio clips may be stored in the music database 160 in a different format. For instance, pre-existing recordings within the music database 160 may preferably be the sampled versions instead of recordings of the full track versions. This not only reduces space but greatly enhances the secure nature of the relational databases. It being contemplated that full track versions for sale are maintained within the purchase partner systems. Where the pre-existing recordings are maintained in the database in a non-compliance format, the audio clip will be translated into the proper format when an audio clip is created for delivery. However, it is similarly contemplated that audio clips may be saved in one or more of a variety of formats because backend storage is cheap and response time of the system is critical.

FIG. 1 also illustrates that message database 170 contains records 171 *a*, 171 *b*, . . . 171 *n* associated with the plurality of personalized messages that are created within the system 100 by a variety of people 101. As depicted, each record 171 may contain a unique identification for each personalized message created within the system, the identification of the sender of the personalized message, the electronic address of the intended recipient of the personalized message, the time the personalized message was sent by the sender, the personalized text associated with the personalized message, the desired lyric phrase, access to the desired audio clip, and metadata. Preferably the access to the desired audio clip will take the form of a handle to the location the desired audio clip (associated with the desired lyric phrase) is stored in association with server 140 (not shown). It is possible—although less preferred due to the rights management issues it may cause—for access to the desired audio clip to take the form of the desired audio clip, itself.

Database 180 contains data related to asset management, which may include, among other data, sender account information. The sender account information will include at least an electronic address for each sender associated with the system 100. The electronic address may comprise an email address, an SMS short code, an SMS long code, or other means of reference one or more communication devices 102 (e.g. telephone number, ESN, IMEI and/or MEID) associated with a sender. Database 180 may also contain data related to sponsorship of the system 100. For example, a company may wish to ingratiate itself to customers or potential customers by subsidizing the use of the pre-existing recordings. In such a case, the sponsoring company may store its logo and other marketing material for use in association with the personalized messages it is financing. A sponsor funds account would also be established in database 180 so that funds may be deducted from the account by the analytic engine 185 upon the occurrence of a predetermined event, such as i. a sponsored user sending an electronic message to the electronic address of a recipient;

ii. the recipient successfully receiving the electronic message; or iii. accessing the handle of the desired audio clip in the personalized message.

It is contemplated that some senders will not want to be exposed to marketing materials of sponsors and some senders will not be interesting to certain sponsors. In either such instance, the system 100 would provide the facility for the sender to fund their own account. By providing a flag (or other mechanism for differentiating between sponsored and unsponsored senders), the system 100 can track which senders are exposed to the marketing materials of one or more sponsors and thus debit all costs associated with creating and sending personalized message from the one or more sponsors.

The analytic engine 185 (FIG. 1A) monitors events generated by at least one (and preferably each) of sender user interface 151, audio extraction engine 152, message generator 153, and recipient user interface 154. A wide variety of behavior is tracked including when a personalized message was created, what type of messaging format the creator and recipient were using, how often that personalized message was viewed by those other than the original recipient (vitality measure), what licensee requested the message, the dollar amount in full track purchases that a specific messages generated and any incentives that were applied.

The administrator manages the sender account databases and authentication methods removing the burden of maintaining personal consumer information from publishers and owners.

Among other potential data gathered by the analytic engine would also be the occurrence of predetermined events that result in charges to the account. By tracking one or more of the types of predetermined events discussed above the analytic engine 185 will be able to gather data for storage in analytic database 190. The data in analytic database 190 may be mined for a variety of purposes. These purposes may be expanded by requesting demographic data from each sender upon the establishment of the sender account within system 100. Furthermore, the collection of the demographic data may provide the user with suggested snippets to send or targeted marketing based specifically on the unique set of demographic and environmental or technical information of the user at any given point in time. For example, a sender's location (zip code or geo-location) may be used to create a playlist that includes potentially preferred pre-existing recordings (e.g. country music for sender's located in Texas).

The system 100 may also include digital rights management (DRM) for anti-piracy (e.g. digital watermarking and audio fingerprinting technologies); playlist generation; and audio thumbnail and albuming technologies. Although in most cases a digital right management strategy will not be necessary the ability to embed a particular DRM at the request of a label may be possible within the system. It is believed that DRM will not be necessary due to (1) the extremely short snippets of song that are created by the system (expected generally to be under 19 seconds in length); (2) the preferred approach to the system and methods of distributing only a handle (or link) to the song clip which is housed in a secure manner at the server and then streaming the audio upon actuation of the clip (rather than downloading the file); and (3) the ability of the system to monetize each playback of the linked song snippet for the publisher/owner and/or limit the number of times the pre-existing recording may be played via the system.

The Process

Figure 2A:
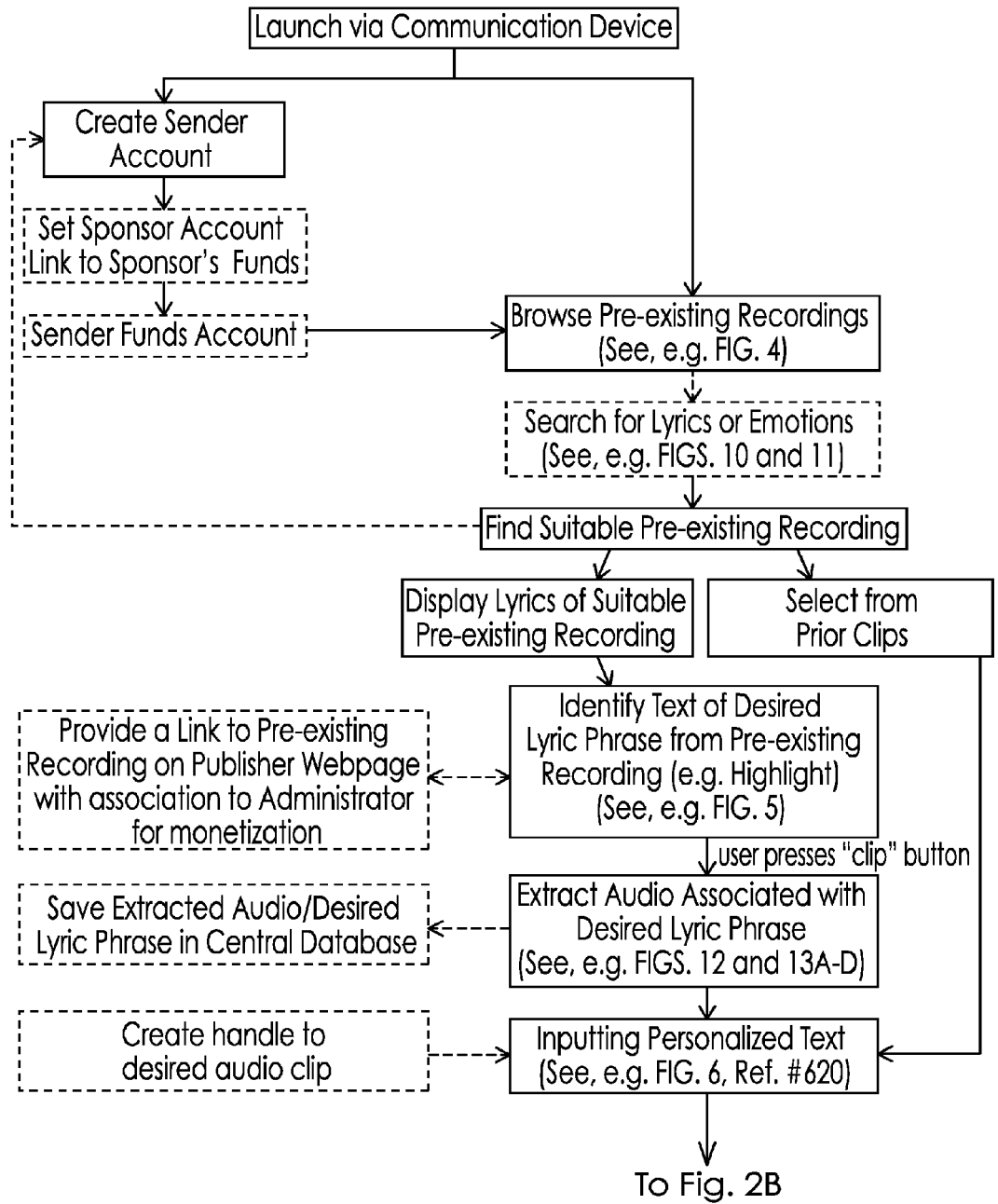
FIGS. 2A and 2B together illustrate the flow of one embodiment of the processes that may be associated with one or more potential approaches to the present invention.
Figure 2B:
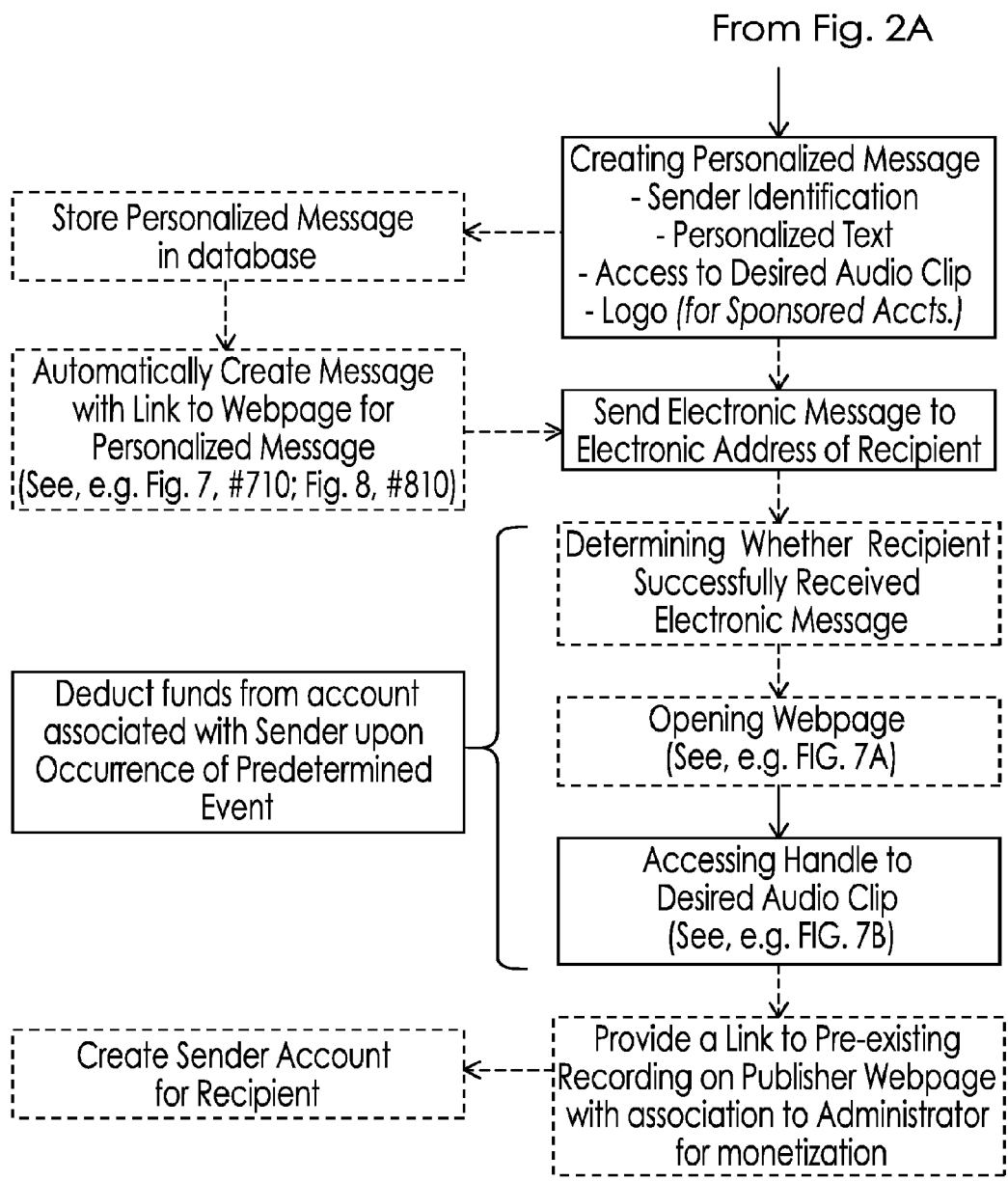

FIGS. 2A and 2B together illustrate the flow of one embodiment of the processes that may be associated with one or more potential approaches to the present invention. Certain of the elements of the process illustrated in FIGS. 2A and 2B have been further illustrated by the screen shots illustrated in FIGS. 3-11. In particular, these screen shots collectively illustrate one potential flow of various aspects of the inventive system and method on one particular type of smartphone. In particular, these screen shots are depicted on a smartphone that includes a touch sensitive screen, such that activation of any depicted button merely requires the touch of a finger or stylus within the real-estate encompassed by that button. Further, although the present application illustrates the invention in times of buttons and touch, it should be understood by those in the art having the present specification and claims before them that the commands used in the system may be spoken (i.e. voice commands) using an interface such as Ski (Apple Computer, Cupertino, Calif.). As should be understood by those of ordinary skill in the art the particular look and feel, text, the ordering of the information used to illustrate this particular embodiment may not be necessary to implement the inventive concepts disclosed herein.

Turning to FIG. 2A, the process begins when a sender launches the application via a communication device 102. The application may be web-based, pre-loaded or otherwise downloaded onto the communication device 102 as a thin (or even thick) client providing a conduit to the sender user interface 151 associated with messaging server 150 or it may be more robust providing more the user interface functionality locally in conjunction with sender user interface 151. The application may be an application programming interface (API) that associates the functionality discussed herein with another program, such as an email program, on-phone messaging applications, interactive video game platforms, browser plug-ins and more.

FIG. 3 depicts a launch icon 310 (among other icons) to start the process. The first time using the process, a sender 101 a will need to create a sender account, although (as illustrated in FIG. 2A) it is possible for the sender to browse, search and find a suitable pre-existing recording before creating the account. The flow of account creation is well understood and thus not illustrated in the drawings. The data that is desired for storage in asset management database 180 (and use with analytical database 190) will be gathered in this process along with an indication of whether the sender is a sponsored sender or an unsponsored sender. Unsponsored senders will need to also established funds (which may also be in the form of credits that may be earned or paid for) for use in paying for the audio snippets/desired audio clips that the sender will wish to include in their personalized messages.

Figure 4A:
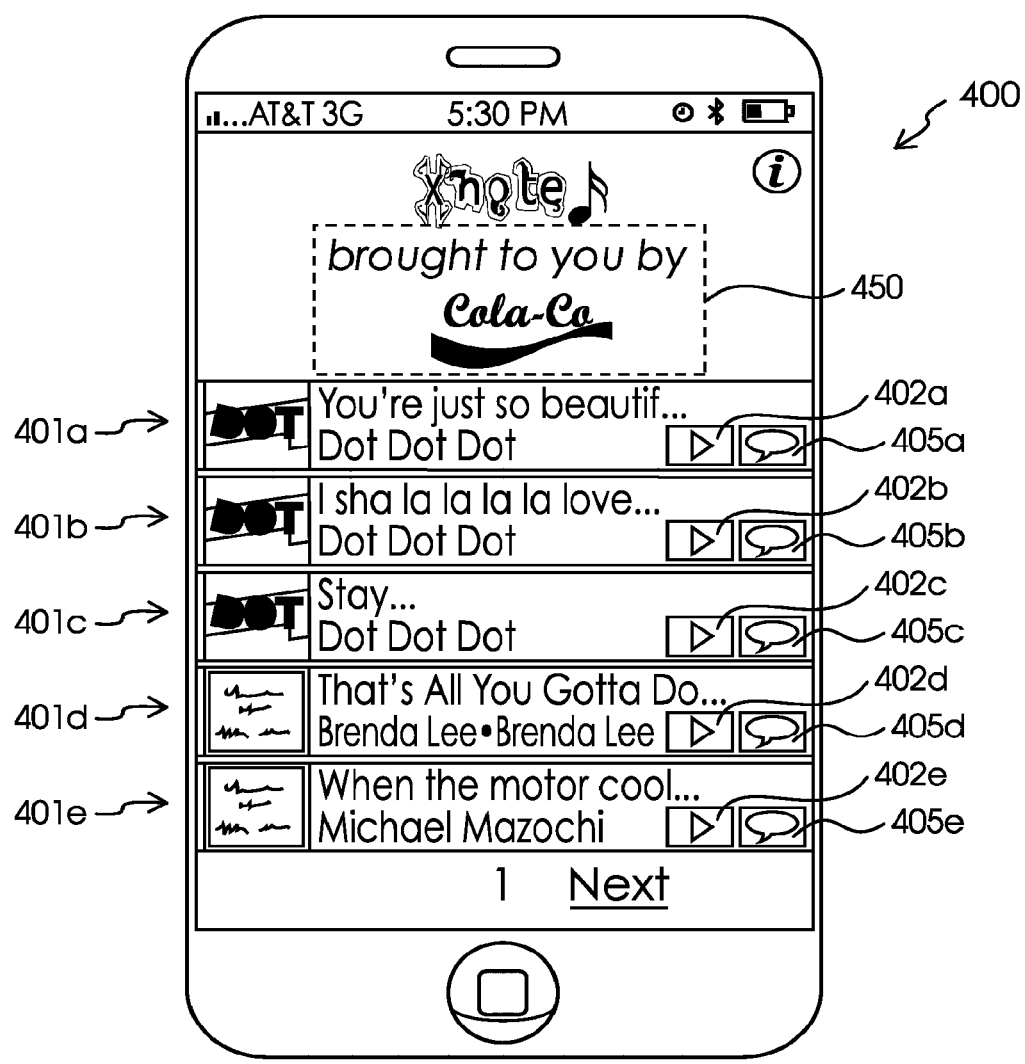
FIG. 4A illustrates one potential aspect of the deployment of the system 100 on one particularly illustrative smartphone-based user interface depicting, in particular, a user interface for browsing pre-existing recordings where the sender's use of the system has been sponsored by a company (referred to as the "Cola Co" (with associated logo) in the example illustrated).

The sender may browse pre-existing recordings looking for a lyric phrase that helps the sender express their current mood or emotions about the intended recipient of the personalized message or the subject contemplated for the personalized message. For instance, the sender 101 a may be excited about a party they will be attending with the intended recipient of the personalized message so they have decided to write the recipient a personalized message to get them excited about the forthcoming events, too. In another example (illustrated in association with FIGS. 4-6), the sender 101 a may be worried about the intended recipient so they have decided to write the recipient a personalized message to convey that the recipient can always count on them to support and/or cheer them up. In particular, in FIG. 4, the sender is browsing through pre-existing recordings 401 a, 401 b, 401 c, 401 d, and 401 e available in music database 160 that have been sorted in alphabetical order by the artists' last names. As would be understood by pressing the "Next" link illustrated near the bottom of the touch screen of communication device 102, another screen of pre-existing recordings 401 through 401 n would be displayed on the screen. (FIG. 4A depicts a slightly different embodiment, where the sender is a sponsored sender and the music browsing screen features the logo and/or branding of the sponsor 450, in the illustrated example this has taken the form of the "Cola Co" logo.) It should be understood that the location, size, and frequencies at which the logo and/or branding of the sponsor 450 may change depending upon the sponsor, user behavior/demographics, and the sender's use of the system.

As illustrated, browsing mode may provide the sender with album cover art work in addition to the title, artist and album associated with each pre-existing recording. In the embodiment illustrated in FIG. 4, by pressing the play button 402 a, 402 b, 402 c, 402 d, or 402 e associated with any particular entry 401 a, 401 b, 401 c, 401 d, and 401 e, respectively, causes the pre-existing recording to play. In the embodiment illustrated in FIG. 4, by pressing the message button 405 a, 405 b, 405 c, 405 d, or 405 e associated with any particular entry 401 a, 401 b, 401 c, 401 d, and 401 e, respectively, causes the screen illustrated in FIG. 5 showing the lyrics 510 associated with the pre-existing recording 401 is launched. These lyrics 510 will be downloaded from the music database 160 through sender user interface 151 preferably via Internet 104 to the communication device 102. As illustrated in FIG. 2A, the sender may be provided with the alternative of selecting from among audio clips that were previously created from the pre-existing recording 401, instead of having to select from the lyrics. These prior clips may be ranked based on their volume of prior usage and/or may be personalized based on the sender's prior interaction with the system. If a prior clip is selected, a new means for accessing the desired audio clip must be created for the message, which may take the form of a new handle created to the desired audio clip or the creation of a new instance of the audio clip for insertion into the message depending upon the approach implemented.

FIG. 5 depicts the next step when the sender decides to display the lyrics of the suitable pre-existing recording toward selecting their own desired lyric phrase (by pressing message button 405 d (see FIG. 4). FIG. 5 also depicts one potential user interface mechanism for identifying the text associated with the desired lyric phrase from a pre-existing recording. By quickly dragging the user's finger in a downward (or upward) motion on the touch screen additional lyrics 510 may be scrolled onto the screen. When the sender sees the lyrics they were looking for, by pressing and dragging their finger across the touch screen of the illustrated smartphone, a selection box may be formed around a portion of the lyrics 505. As is known by end users of such smartphones, the size and position of the box can be changed by placing their finger at a different location on the touch screen and dragging it along the screen until the selection box encompasses the desired lyric phrase 510 from the pre-existing recording 401 *d*. As would be understood by those of skill in the art other user interfaces for scrolling and selecting text on a screen such as cursor manipulation with a mouse, touchpad, track wheel or other pointing device would work in a similar manner to that discussed above. It is possible, that the sender won't find the lyrics they were hoping to find within a particular pre-existing recording, in which case by selecting the back arrow 515, they would be returned to the portion of the user interface depicted in FIG. 4. The user interface of FIG. 5 also provides a link 525 to the entire pre-existing recording directly from the publisher (in the illustrated example iTunes) webpage associated with recording to provide the sender an easy opportunity to purchase the whole pre-existing recording. The link 525 would have an association to the administrator of the system 100 so that it can monetize the sender's acquisition of the pre-existing recording. In other words, if the sender buys a song from iTunes because they saw it on the system 100, iTunes may compensate the owner of the system for the referral. Various types of mechanisms for crediting referring sites for "click-throughs" such as cookies are well-known to those of ordinary skill in the art.

Figure 12:
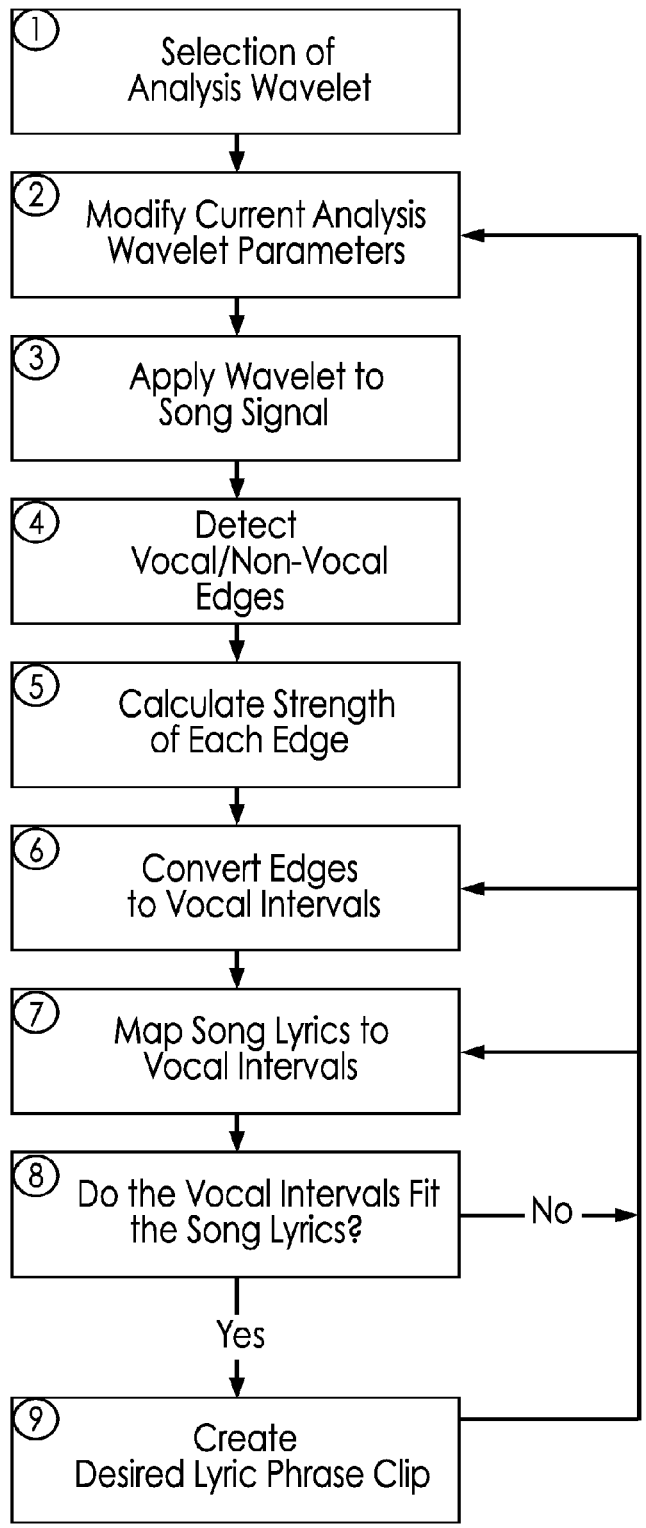
FIG. 12 illustrates the flow of one potential embodiment of the process that extracts the audio substantially associated with a desired lyric phrase from a selected pre-existing recording into a desired audio clip.

If the desired lyric phrase 510 has been selected from the lyrics 510 of the pre-existing recording, the "Next" button 520 (near the top right of FIG. 5) would be selected in the illustrated interface, which would prompt the extraction of the audio clip substantially associated with the desired lyric phrase to begin via a substantially automated process that will be discussed in association with FIGS. 12 and 13 later in the application. It is contemplated that the extracted audio clip and associated desired lyric phrase may be saved in central database, such as database 160 or 180 to minimize the need to perform extractions (which may be processor intensive) particularly where the desired lyric phrase has been or is expected to be popular. In such instances where the extracted audio has been saved, the inventor still think of this as having extracted the audio associated with a desired lyric phrase. In a preferred embodiment of the process, a handle is created that points to the storage location of the desired audio clip, such that the handle can be included in the personalized message rather than actually embedding the desired audio clip. This is desirable for a few reasons including, but not limited to, safer rights management and minimizing the size of personalized messages, which may be stored and/or transmitted.

Returning to FIG. 2A, after selecting the desired lyric phrase, the sender creates the rest of the personalized message. One illustrative interface for this task is shown in FIG. 6. In no particular order, the sender identification 605 may be input manually or automatically populated by the sender user interface 151; the electronic address of the recipient 615 is input; and a personalized text is input into text field 620. The recipient address may be retrieved from a local address book on the communication device 102 by selecting button 616 and operating the address book in a well-known manner. The sender may input personalized text into text field 620 using an onscreen keyboard (which has not been depicted in FIG. 6) so as not to obscure the option of displaying the desired lyric phrase 510 in a convenient location to the text field 620 so the sender may coordinate the personalized text with the desired lyric phrase 510. As depicted in FIG. 6, the interface may provide the sender with the number of characters remaining within the message format 625. It is contemplated that the personalized text may have no characters.

Rather than send a text-based message, after selecting the desired lyric phrase, the sender could create an audio message that may be delivered by playing back a recording that is comprised of both the extracted audio, but also audio recorded by sender for inclusion as a personal message. In such an embodiment, the sender would input the electronic address of the recipient 615 as a telephone number and then speak a personalized text, which may be converted to text by a speech-to-text engine. It would be similarly possible for the user to type the desired text of the personalized message for it to be converted to audio via a text-to-speech program. In any approach, the extracted audio and the personalized audio are recorded together and then distributed.

Figure 8:
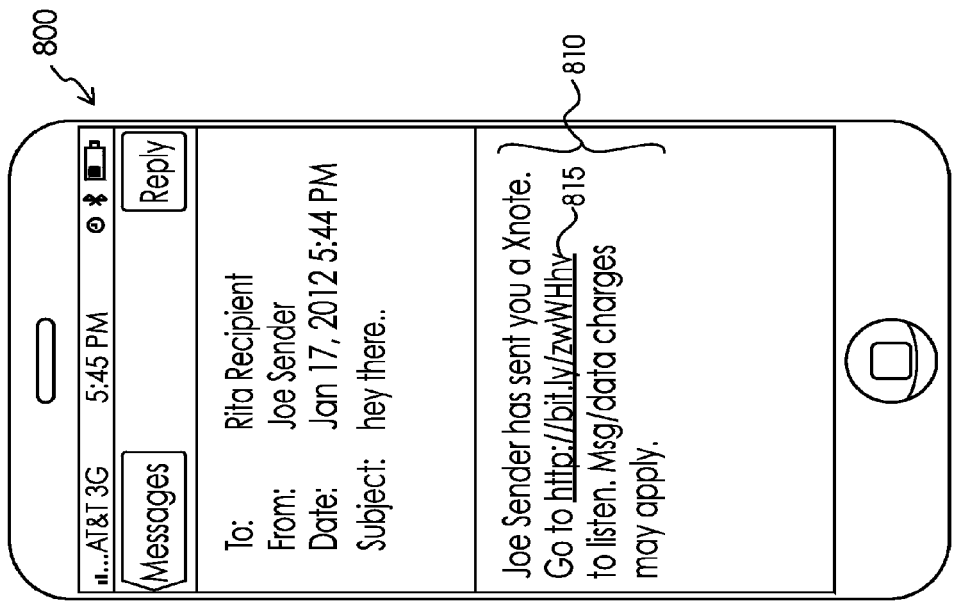
FIG. 8 illustrates the receipt by the recipient on an illustrative communication device (i.e. smartphone) of an electronic message including a link to the personalized message created by the sender as automatically created and sent by system 100 in the form of an email message.
Figure 9:
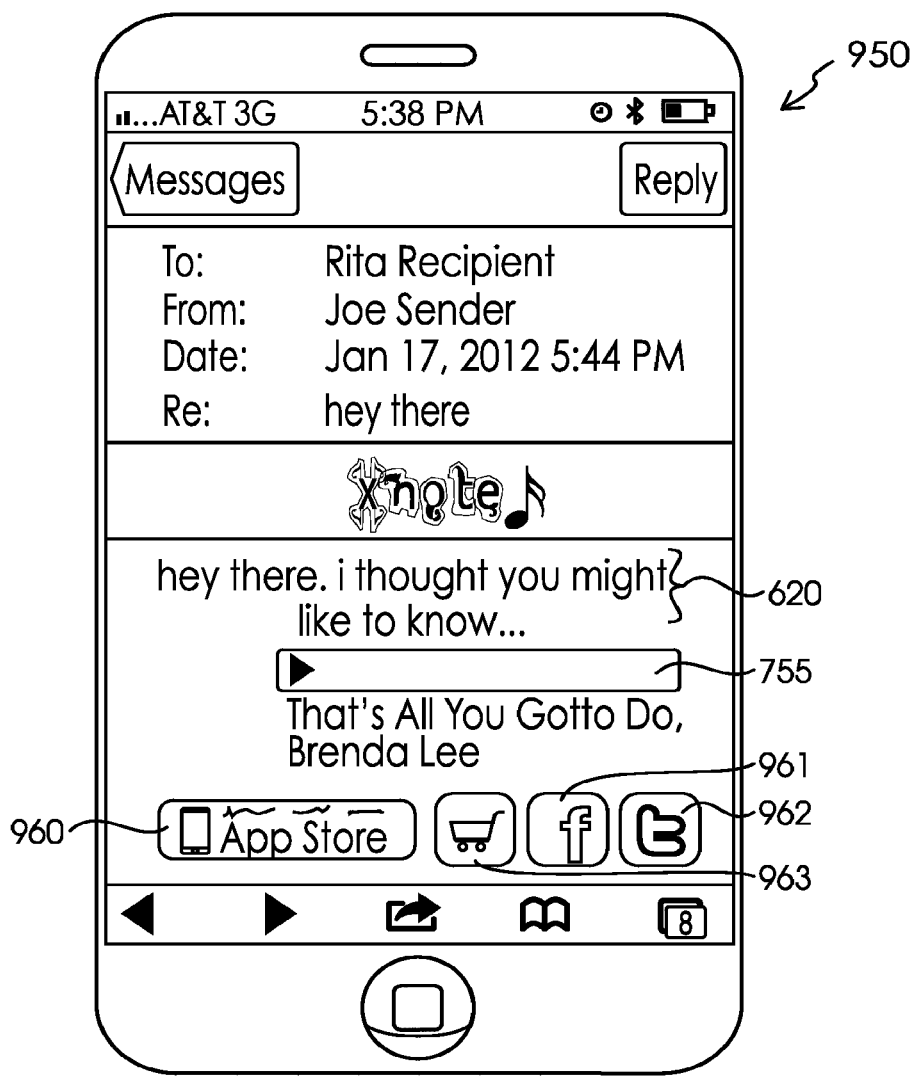
FIG. 9 illustrates the receipt by the recipient on an illustrative communication device (i.e. smartphone) of an electronic message automatically created and sent by system 100 in the form of an email message comprised of the personalized message created by the sender.

Turning to FIG. 2B, message generator 153 within messaging server 150 creates the personalized message including sender identification, the personalized text, access to the desired audio clip, and where the sender is a sponsored sender, the logo or other marketing materials that the sponsor wanted included with the personalized message. It should be understood that any particular sponsor may choose not to include any logo or other marketing materials in the personalized message, but rather rely upon sponsorship branding in other aspects of the user interface such as the audio browsing screens, as illustrated above in association with FIG. 4A. The message generator 153 then generates and sends an electronic message to the electronic address of the recipient via either SMS/EMS/MMS messaging system 155 and cellular phone system 103 or Internet 104 depending on the type of electronic address provided by sender 101 *a*. The electronic message may be an SMS/EMS/MMS message, instant message or email message including a link to the personalized message or an EMS/MMS or email message including the personalized message. FIGS. 7, 8 and 9 best illustrate many of the differences between these potential types of electronic message. FIG. 7 illustrates the receipt by the recipient on a smartphone of an electronic message that includes a link 715 to the personalized message created by the sender. In this exemplary illustration of FIG. 7, the text 710 with embedded link 715 are automatically created and sent by the server 140 in the form of a text (e.g. SMS/EMS/MMS) message. FIG. 8 illustrates the receipt by the recipient on a smartphone of an electronic message including a link 815 to the personalized message created by the sender. In this exemplary illustration of FIG. 8, the text 810 with embedded link 815 were automatically created and sent by server 140 in the form of an email message. Finally, FIG. 9 illustrates the receipt by the recipient on a smartphone of an electronic message automatically created and sent by server 140 in the form of an email message comprised of the actual personalized message created by the sender.

Returning to FIG. 7, when the recipient clicks on link 715, in the manner controlled by the operating system associated with the communication device 102 a browser is launched and directed to open the webpage at the address of the link. The result of that process on the recipient's communication device 102 in the illustrative example is depicted in FIG. 7A. By pressing the play button in audio bar 755, the recipient accesses the desired audio clip included by the sender in the personalized message and the audio begins to play via the speaker associated with communication device 102. While the default is for the audio clip to be displayed after the personalized text, the audio bar 755 may be positioned by the sender anywhere in the text when creating the message.

In the most preferred embodiment, the desired audio clip has been maintained by the centralized host (e.g. server 140) such that clicking on the play button causes the contents of the file to be streamed to the recipient's communication device 102 in substantially real time and played via the audio system of that communication device 102.

Figure 7B:
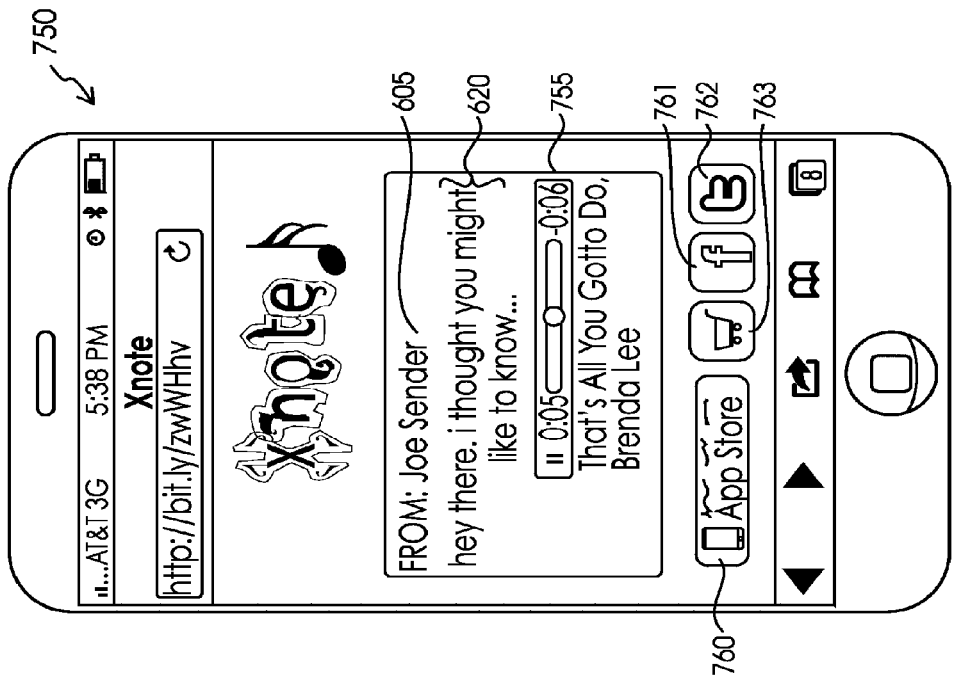
FIG. 7B illustrates the state of the recipient's illustrative communication device (i.e. smartphone) after clicking on the link in the electronic message automatically created and sent by system 100 in the form of a text (e.g. SMS/EMS/MMS) message as illustrated in FIG. 7, depicting the playback of the desired audio clip from within the personalized message created by the sender as generated in association with the recipient user interface of messaging server 150 of FIG. 1.

As illustrated in FIG. 7B, a progress indicator in audio bar 755 may show timing information associated with the current playback of the audio snippet. A pause button is also illustrated and would have the functionality widely understood by end users. As further depicted in FIGS. 7A and 7B, the recipient is provided with a button 760 that would download the client portion of the application onto their communication device allowing them to create a sender account and send personalized messages via the system 100. Other buttons may also be provided so the recipient can share a description of the personalized message on a first social network (such as Facebook®) (button 761) or on a second social network (such as by Tweeting) about the personalized message (via button 762). In both instance, the system may also allow the personalized text and textual information associated with the desired audio clip to be posted on either or both of first and second social networks.

Every personalized message is tracked and recorded in the analytics database along with several parameters such as the licensee that initiated creation, device type of each play etc. The personalized messages may be designed to be circulated and replayed via channels like social networks. While the ability of the personalized messages to travel through various networks to be experienced by many is valuable, the present system is mainly focused on the ability to provide a new form of peer-to-peer communication that provides a marketing opportunity for sponsors.

It is also contemplated where the sender wants privacy for the message, the buttons may be disabled by selecting options before sending the personalized message. The final button that may be provided by the recipient user interface 154 is a shopping cart button 763, which would take the recipient to a webpage hosted by the publisher (such as Rhapsody, Pandora, or iTunes) associated with complete recording from which the audio snippet was taken to provide the recipient an easy opportunity to purchase the whole pre-existing recording. The button 763 would have an association to the administrator of the system 100 so that the administrator can monetize the recipient's acquisition of the pre-existing recording. In other words, if the recipient buys a song from iTunes because they received it in a personalized message created by the system 100, iTunes may compensate the owner of the system for the referral. Various types of mechanisms for crediting referring sites for "click-throughs" (such as cookies) are well-known to those of ordinary skill in the art.

Figure 8A:
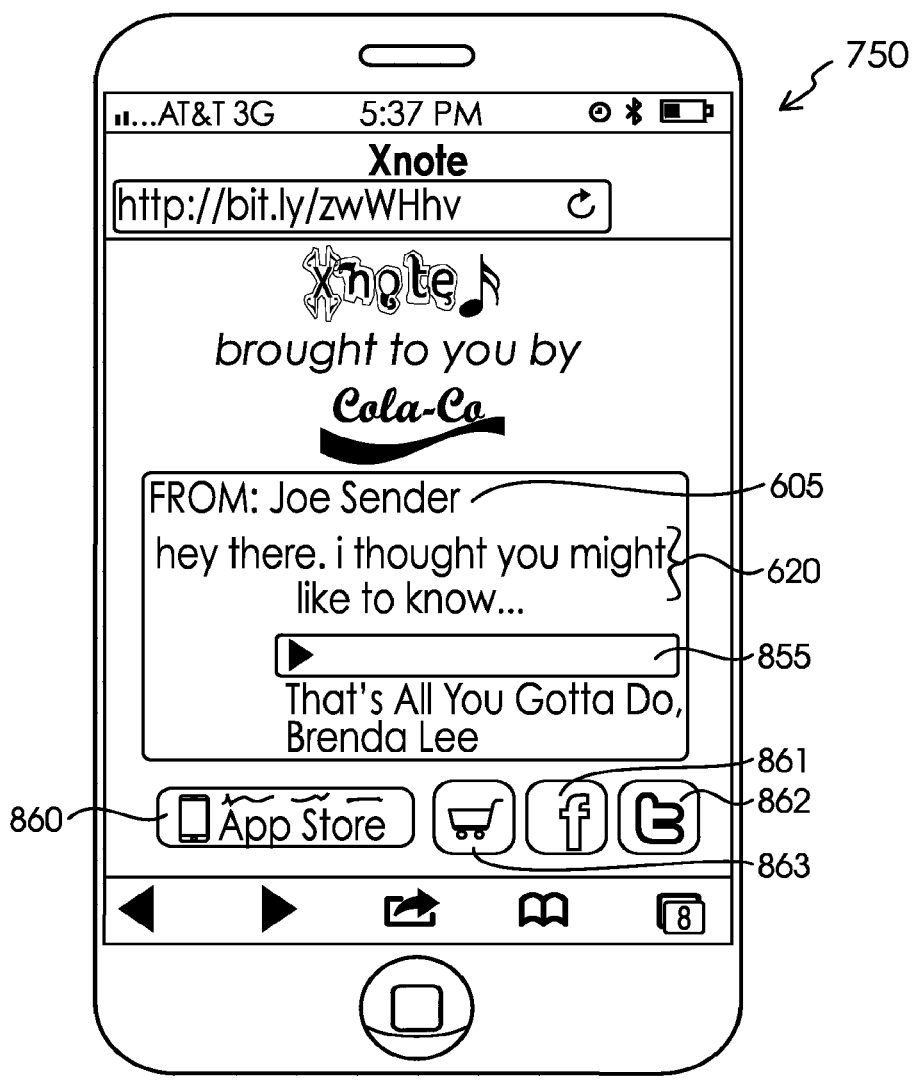
FIG. 8A illustrates the state of the recipient's illustrative communication device (i.e. smartphone) after clicking on the link in the electronic message automatically created and sent by system 100 in the form of an email message as illustrated in FIG. 8, depicting the personalized message created by the sender as generated in association with the recipient user interface of messaging server 150 of FIG. 1 where the sender's use of the system has been sponsored by a company (referred to as the "Cola Co" (with associated logo) in the example illustrated).

Returning to FIG. 8, when the recipient clicks on link 815, in the manner controlled by the operating system associated with the communication device 102 a browser is launched and directed to open the webpage at the address of the link. The result of that process on the recipient's communication device 102 in the illustrative example is depicted in FIG. 8A in an example where the sender is a sponsored sender. Consequently, while the result of selecting link 815 in FIG. 8 and link 715 in FIG. 7 are practically identical, FIG. 8A additionally illustrates one potential approach to sponsorship branding of the system. As with the exemplary interface illustrated in FIG. 7A, by pressing the play button in audio bar 855 in FIG. 8A, the recipient accesses the desired audio clip that was selected by the sender for inclusion in the personalized message and the audio begins to play via the speaker associated with communication device 102. As further depicted in FIG. 8A, the recipient is provided with a button 860 to download the client portion of the application onto their communication device. First social network button 861, second social network button 862 and shopping button 863 have the same functionality as that disclosed in association with buttons 760, 761, 762, and 763 in FIGS. 7A and 7B.

Returning to FIG. 9, the email message 950 depicted incorporates the personalized message that the text and email embodiments of FIGS. 7 and 8 required the intermediate step of launch a browser and opening a webpage. Here the functionality provided on the webpages of FIGS. 7A and 8A is included directly in the body of the email message 950. As should be understood, the recipient is provided with a button 960 to download the client portion of the application onto their communication device. First social network button 961, second social network button 962 and shopping button 963 have the same functionality as that disclosed in association with buttons 760, 761, 762, and 763 in FIGS. 7A and 7B. It is also contemplated that if a sponsored sender created the personalized message in a situation where the sponsor wanted created in the received email message 950 for having supported the communication, the email message would include the sponsor marketing materials, too (as illustrated in the embodiment of FIG. 8A).

Figure 11:
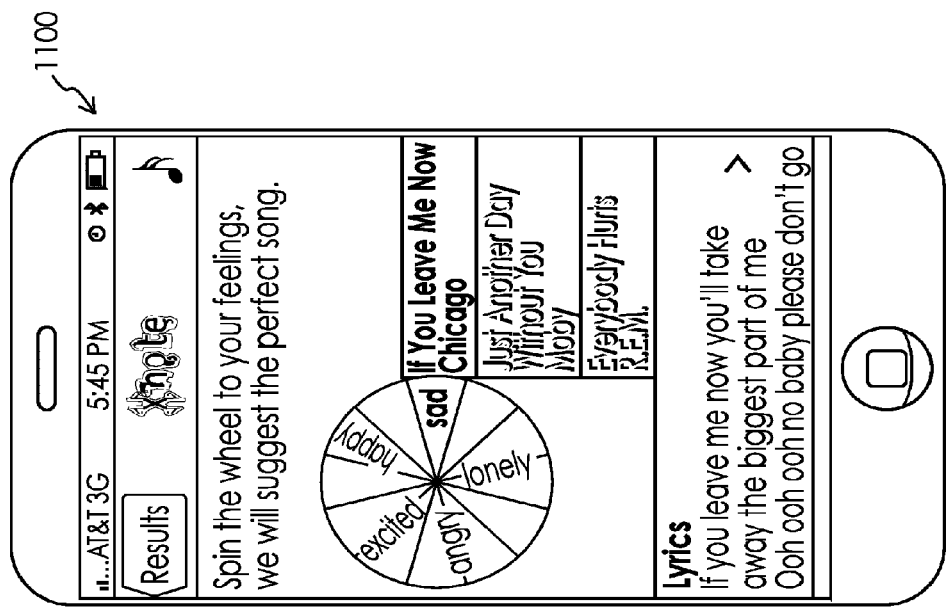
FIG. 11 illustrates one potential aspect of the deployment of the system 100 on one particularly illustrative smartphone-based user interface depicting, in particular, a user interface for searching for one or more pre-existing recordings available through system 100 associated with a desired emotion from a list of possible emotions.
Figure 10:
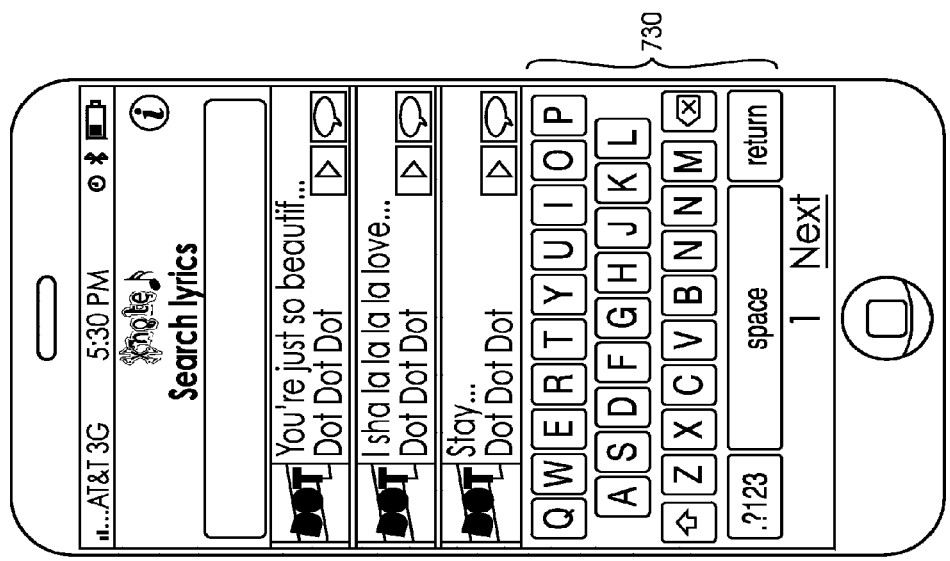
FIG. 10 illustrates one potential aspect of the deployment of the system 100 on one particularly illustrative smartphone-based user interface depicting, in particular, a user interface for text searching for a desired lyric phrase within the one or more pre-existing recordings available through system 100.

FIG. 10 illustrates a user interface for text searching for a desired lyric phrase within the one or more pre-existing recordings available through system 100. In particular, by using a keyboard such as on-screen keyboard 730, the sender could type in a lyric like "call me" or "can't wait to see you" and then the sender user interface 151 will winnow down the potential pre-existing recordings to those that contain the exact lyrics (or in some embodiment fuzzy alternatives to the searched terms). FIG. 11 illustrates another potential user interface for searching for one or more pre-existing recordings available through system 100 associated with a desired emotion from a list of possible emotions. As illustrated, a list of emotions, such as angry, excited, happy, sad, lonely, etc. may be included on a wheel that rotates past a selector arrow. After the emotion is selected a list of song is compiled and displayed. As illustrated in FIG. 11, if the emotion "sad" is selected the song "If You Leave Me Now" by Chicago and two other songs are listed. The sender can select one of those songs, which would open an interface similar if not identical to that of FIG. 5 so that the sender can identify text of the desired lyric phrase from within the song. FIG. 11 also depicts the possibility of providing a lyric preview window to help the sender in the selection of songs to review for a desired lyric phrase.

If the music database 160 used within the system is to be small and slowly growing—for example 100's of clips with 10 new clips being added every day—then it is technically and economically practical that each clip be hand-crafted. If, on the other hand, the music database 160 is to be large and rapidly growing—for example 10,000's of clips with 1,000 new clips being added every day—then some automatic or semi-automatic method of creating clips must be defined. This is particularly the case if it is expected to be able to handle on-request and in real-time the creation of a system that isn't already in the catalog. The audio extraction engine 152 automates this operation.

Returning now to FIG. 1A, the audio extraction engine 152 is operably associated with the music database 160 and the sender user interface 151 to extract audio substantially associated with the desired lyric phrase 510 (see FIG. 5) found within one of the plurality of pre-existing recordings

401 *d* (see FIG. 4) into a desired audio clip. The music database provides two inputs into the audio extraction engine: the pre-existing digital recording (which may be in any one of a variety of digital formats such as MP3, WAV, MPEG-4) containing the desired lyric phrase; and the song lyrics sung in the pre-existing digital recording. The sender user interface 151 provides the desired lyric phrase. Using these pieces of data, the audio extraction engine extracts the audio substantially associated with the desired lyric phrase from the pre-existing recording making it into a desired audio clip.

Figure 13A:
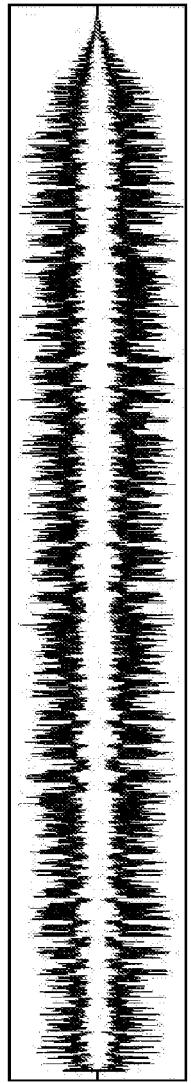
FIG. 13A is a pictogram of the time-domain audio signal of a pre-existing recording of "Bring It On Home to Me©" as sung and recorded by Sam Cooke.

For example suppose the pre-existing recording is the song "Bring It On Home To Me©" as sung and recorded by Sam Cooke. FIG. 13A is a pictogram of the time-domain audio signal of a pre-existing recording of this pre-existing recording. The song lyrics sung in this pre-existing recording are given in Table 1 below where the desired lyric phrase ("You know I'll always be your slave") selected by the sender 101 using sender user interface 151 has been highlighted in bold face letters.

TABLE 1

Lyrics of "Bring It On Home To Me ©" as sung by Sam Cooke

If you ever change your mind
About leavin', leavin' me behind
Oh, oh, bring it to me
Bring your sweet lovin'
Bring it on home to me, oh yeah
You know I laughed (ha ha) when you left
But now I know I've only hurt myself
Oh, oh, bring it to me
Bring your sweet lovin'
Bring it on home to me, yeah (yeah) yeah (yeah) yeah (yeah)
I'll give you jewelry, money too
And that's not all, all I'll do for you
Oh, oh, bring it to me
Bring your sweet lovin'
Bring it on home to me, yeah (yeah) yeah (yeah) yeah (yeah)
Yeah
You know I'll always be your slave
Till I'm dead and buried in my grave
Oh, oh, bring it to me
Bring your sweet lovin'
Bring it on home to me, yeah (yeah) yeah (yeah) yeah (yeah)
If you ever change your mind
About leavin', leavin' me behind
Oh, oh, bring it to me
Bring your sweet lovin'
Bring it on home to me, yeah (yeah) yeah (yeah) yeah (yeah)
Yeah (yeah) yeah (yeah)

In one approach to audio extraction the process/system can be thought to generally comprise two phases: first, an algorithm for finding segments ("vocal intervals") in the pre-existing recording that contain singing; and second an algorithm for mapping or fitting the song lyrics onto the vocal intervals identified by the first phase. The audio extraction engine may iterate back and forth between the Phase I and Phase II algorithms until a satisfactory fitting of the lyrics to the vocal intervals has been realized. Once this is achieved, the vocal interval containing the desired lyric phrase may be located from within the vocal intervals. FIG. 12 is an illustration of the flow between the various steps and processes undertaking by the audio extraction engine 151. The two phases are described in more detail below.

Phase I: Vocal Interval Identification
Step #1: Selection of Analysis Wavelet

There are identified in the art basic wavelets (also called wavelet templates or mother wavelets) that are well-suited for analyzing popular music. In Step #1 an initial scan of the digitized signal (FIG. 13A) in the pre-existing recording that does not take into account the lyrics may be performed to determine which of these basic wavelets is most appropriate for the particular pre-existing recording at hand.

As the number of basic wavelets well-suited for analyzing popular music is small—on the order of 10—one way of accomplishing the selection of the analysis wavelet is to apply each of the basic wavelets with their associated default popular music parameterization as given in the literature to the pre-existing recording and to pick the basic wavelet that yields the best result.

In our running example we will use the Blackman wavelet (without any intention that the invention be limited to the use of the Blackman wavelet), the basic form of which is:

$$\omega(t) = 0.42 - 0.5\cos\left(2\pi\frac{t}{\gamma}\right) + 0.08\cos\left(4\pi\frac{t}{\gamma}\right)$$

Step #2: Modify Current Analysis Wavelet Parameters

The mathematical specification of a basic wavelet includes parameters ("free variables") that must be given values in order to apply it to the music signal. In our running Blackman wavelet example, there is only one parameter, $\gamma$. In Step #1 above, the parameters were given default values. In Step #2 the parameters of the selected basic wavelet currently being used for vocal interval identification may be modified. If this is the first time Step #2 has been executed, then the parameters of the basic wavelet may be adjusted to new values based on fundamental characteristics of the digital audio signal in the pre-existing recording. If this is not the first time Step #2 is being executed (e.g. Step #2 is being executed again after the execution of Steps #3 through Step #8), then the current parameter values are adjusted to new parameter values based on the details of the lack of fit of the lyrics to the vocal intervals computed in Step #8 below. The exact nature of this adjustment depends on the particular basic wavelet having been selected in Step #1 and currently being used to define the vocal intervals.

Step #3: Apply Wavelet to Song Signal

The fully parameterized wavelet determined in Step #2 is applied to the digitized signal in the pre-existing recording. The result is an m-by-n, time-by-frequency matrix of numbers where each number represents the amount of energy present in the song at a particular frequency at a particular time. An entry X at position ($m_1$, $n_1$) in this matrix would for example mean that at $m_1$ milliseconds from the beginning of the song the amount of energy at frequency $n_1$ was X. X is typically a unitless numerical value indicating, for example, the ratio of the amount of energy present at frequency $n_1$ at time $m_1$ and the maximum energy at any frequency at time m1.

Figure 13C:
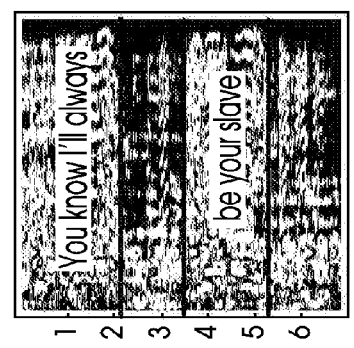
FIG. 13C is a close up view of a portion of the frequency-domain illustration of FIG. 13B showing the vocal intervals and superimposed lyrics mapped onto the established vocal intervals at the portion of the desired lyric phrase in Example 1 in the Specification.
Figure 13B:
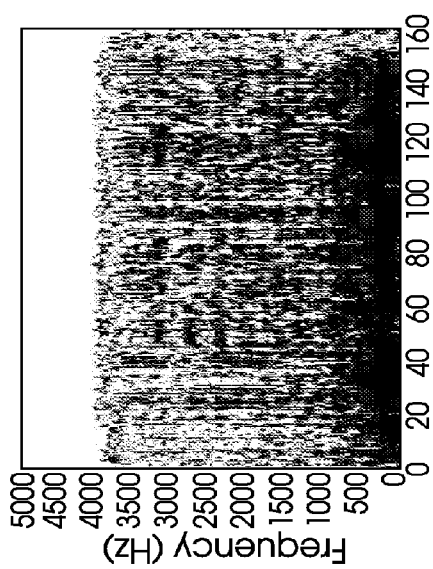
FIG. 13B is an illustration of the frequency domain version of the time-domain audio signal illustrated in FIG. 13A created using a Blackman wavelet.
Figure 13D:
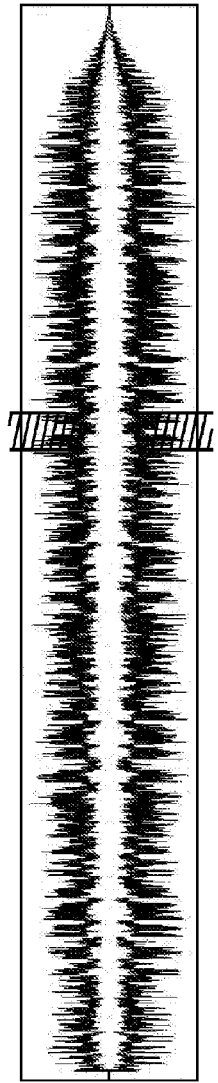
FIG. 13D is the same pictogram of the time-domain audio signal of a pre-existing recording of "Bring It On Home to Me©" as in FIG. 13A with the desired audio clip indicated by a selected region in the figure.

FIG. 13B illustrates the application of the Blackman wavelet the pre-existing recording of "Bring It On Home to Me©" as sung and recorded by Sam Cooke. FIG. 13C is a close up of illustration of FIG. 13B at the desired lyric phrase ("You know I'll always be your slave").

Step #4: Detect Vocal/Non-Vocal Edges

We shall call the boundary or transition time moment between a time interval during which there is singing and a time interval during which there is no singing an edge. That is, an edge is a moment in time on one side of which there is singing and on the other side of which there is no singing.

The wavelet parameters have been adjusted in Step #2 so that when the resulting fully-parameterized wavelet is applied to the digital signal in Step #3 the time intervals during which there is singing are maximally differentiated from time intervals in which there is no singing.

In Step #4, then, the edges in the time-by-frequency matrix produced in Step #3 are identified and sharpened using edge detection algorithms known in the current art. These algorithms include but are not limited to:
- number of zero crossings
- low-energy ratio
- spectral centroid
- spectral roll-off
- spectral flux
- Mel frequency capstrum coefficients (MFCC)

Step #5: Calculate Strength of Each Edge

The edges identified by Step #4 will not be of equal clarity or definiteness. Some will be very distinct and obviously be boundaries between singing and non-singing. Others will be less distinct and could, for example, simply indicate that singing has gone from a high pitch to a low pitch, from a solo to a chorus, or from pianissimo to fortissimo. In Step #5 a numerical value is assigned to the definiteness or strength of each edge produced by Step #4. A high value on this measure indicates that it is highly likely that this edge is a singing/non-singing transition while a low value means the edge is less likely to be a singing/non-singing transition.

Step #6: Convert Edges to Vocal Intervals

Using the edge strengths produced in Step #5 the method next identifies edges which will be asserted to be the start of singing and edges that will be taken to be the stop of singing. For a start edge there is no singing before the edge and singing after the edge. For a stop edge there is singing before the edge and no singing after the edge. Start and stop edges must alternate. The time interval between a start edge and a stop edge shall be referred to as a vocal interval. The length of time between the start edge and the stop edge is the duration of the vocal interval.

Phase II: Mapping of Song Lyrics to Vocal Intervals

Step #7: Map Song Lyrics to Vocal Intervals

In Step #7 words in the song lyrics are assigned to the vocal intervals created by Step #6 such that the last lyric word placed in one vocal interval is the lyric word immediately before the first lyric word in the following vocal interval. Each lyric word is mapped to exactly one vocal interval.

By way of a pedagogical example, suppose there are 100 words, $w_1, w_2, \ldots w_{100}$, in the song lyric and suppose 10 vocal intervals, $I_1, I_2, I_{10}$, have been created by Step #6. Associating the first 10 lyric words, $w_1, w_2, \ldots, w_{10}$, with the first vocal interval $I_1$; the second ten lyric words $w_{11}, w_{12}, \ldots w_{20}$, with the second vocal interval $I_2$, and so forth would be a mapping however naïve of the song lyrics to the vocal intervals.

In performing this mapping one takes into account the phrase structure of the song lyric. Thus, using the above example, one would try to map the entire lyric phrase "You know I'll always be your slave" to a single vocal interval such that these lyric words would be the only words assigned to this vocal interval.

Step #8: Do the Vocal Intervals Fit the Song Lyrics?

In Step #8 an assessment is made as to how well Step #7 has mapped the song lyrics to the vocal intervals. Particular attention is paid to the fit of the interval containing the desired lyric phrase (3). If the overall fit as computed in Step #8 is satisfactory, if the fit of the desired lyric phrase is excellent, and if the start edge and the stop edge of the vocal interval containing the target lyric phrase are strong as measured in Step #5 then proceed to Step #9. If the fit is not satisfactory or if the vocal interval to which the target lyric phrase has been assigned is not well-defined then go back to Step #2 or Step #6 or Step #7.

Step #9: Create the Clip of the Desired Lyric Phrase

In the case that Step #8 determines that the overall fit of the vocal intervals to the song lyric is satisfactory and that the edges of the vocal interval containing the target lyric phrase are sufficiently strong, then the audio engine would extract the vocal interval containing the desired lyric phrase from pre-existing recording. This synchronization between the audio and the lyrics may be maintained for future use by the system, which could—among other things—support the sender's replay of synchronized audio with the selection of particular lyrics.

Although it is generally believed that the processes and apparatus used for audio extraction will perform appropriately, in one embodiment of the invention, the location of the identified segment digital recording within the digital recording may be displayed to a human operator for review, editing, adjustment and refinement before the final version of the desired audio clip is finally created. Similar processes may be provided for later manual revision of a desired audio clip that was snipped (or otherwise extracted) differently from the desired lyric phrase.

There are a number of assumptions regarding the nature of popular music and the selection of lyric phrases there from that can yield optimizations in the above canonical algorithm. For instance, the system may base optimizations on song defined lyrical phrases. Referring back to Table 1, "Lyrics of Bring It On Home To Me as sung by Sam Cooke" above it can be assumed that a desired lyric phrase is coterminous with a lyric phase in the song lyrics. For example, it is more likely that a desired lyric phrase is a phrase of the song lyrics such as "You know I'll always be your slave" rather than a subsequence of lyric that does not adhere to song lyric phrasing such as a desired lyric phrase as "your slave Till I'm dead" that consists of the end of one song lyric phrase and the beginning of the next song lyric phrase.

The foregoing description and drawings merely explain and illustrate the invention and the invention is not limited thereto. While the specification in this invention is described in relation to certain implementation or embodiments, many details are set forth for the purpose of illustration. It will thus be appreciated that those skilled in the art will be able to devise various arrangements which, although not explicitly described or shown herein, embody the principles of the invention and, thus, fall within its scope and spirit.

What is claimed is:

1. A computer program product embodied on a non-transitory computer readable medium, comprising code executable by a computer having a processor and a graphical user interface and arranged to communicate with at least one music messaging software-as-a-service platform, to cause the computer to carry out the following steps:

accessing the at least one music messaging software-as-a-service platform;

communicating to the at least one music messaging software-as-a-service platform a set of first information, the set of first information including a message personalized for an intended recipient;

selecting, via the graphical user interface, at least one category of pre-existing recording to be retrieved;

retrieving, from the at least one music messaging software-as-a-service platform, at least one pre-existing recording, said pre-existing recording associated with the at least one selected category;

selecting, via the graphical user interface, a desired lyric phrase from within a preexisting recording;

communicating the selection of the desired lyric phrase to the at least one music messaging software-as-a-service platform in the form of non-audio data identifying a lyric phrase from an audio recording, the at least one music messaging software-as-a-service platform comprising an audio extraction engine that (i) receives the non-audio data identifying the lyric phrase together with an instance of the audio recording, (ii) identifies a portion of the audio recording where the lyric phrase is likely to be found at least in part by mapping each word in the lyric phrase to one and only vocal interval determined to exist in the audio recording, (iii) extracts the portion of the audio recording into a short snippet; and (iv) writes the short snippet into a database; and directing, the at least one music messaging software-as-a-service platform, via the graphical user interface, to generate, output, and deliver a music message note for the intended recipient, wherein the music message note is based on the short snippet.

2. The computer program product of claim 1, wherein pre-existing recordings are sorted by emotion, and wherein the at least one category of pre-existing recording to be retrieved comprises data associated with a mood or emotion.

3. The computer program product of claim 2, wherein a lyric phrase within a pre-existing recording is associated with a mood or emotion.

4. The computer program product of claim 1, wherein the set of first information further includes sender location information.

5. The computer program product of claim 4, wherein the sender location information is a geo-location.

6. The computer program product of claim 4, further comprising adjusting availability of pre-existing recordings to the sender as a result of the sender location information.

7. The computer program product of claim 1, wherein the music message note is provided in the form of an audio message.

8. The computer program product of claim 1, wherein the music message note is one of: SMS, MMS, or email.

9. The computer program product of claim 1, further comprising:
receiving an advertisement from a sponsor to be displayed to the sender;
displaying the advertisement on the graphical user interface;
determining whether the sender has met an exposure threshold for exposure to the advertisement; and
debiting a cost associated with generating, outputting, and delivering a music message note from the sponsor.

10. The computer program product of claim 1, further comprising:
receiving an incentive offer from a sponsor to be displayed to the sender;
displaying the incentive offer on the graphical user interface;
reporting whether the sender has accepted the incentive offer or declined the incentive offer; and
if the sender has accepted the incentive offer, implementing the incentive offer.

11. The computer program product of claim 1, further comprising:
selecting a social network on which the music message note is to be shared; and
sharing the music message note on the social network.

12. The computer program product of claim 1, sending messages requires a sender user account, and wherein the sender user account has a user credit balance comprising at least one of earned credits and paid-for credits.

13. The computer program product of claim 12, wherein at least one of the selection of a pre-existing recording by the sender or the selection of a lyric phrase within the pre-existing recording by the sender causes the user credit balance of the sender to be debited.

14. The computer program product of claim 12, wherein the sender user account is associated with at least one purchased pre-existing recording, and wherein the selection of a purchased pre-existing recording by the sender or the selection of a lyric phrase within the purchased pre-existing recording by the sender does not cause the user credit balance of the sender to be debited.

15. The computer program product of claim 1, wherein the music message note is personalized for the intended recipient.

16. An apparatus provides communication between a sender and a recipient, comprising:
A computer having a processor, a memory, and a graphical user interface, at least one music messaging software-as-a-service platform;
communicating to the at least one music messaging software-as-a-service platform a set of first information, the set of first information including a message personalized for an intended recipient;
selecting, via the graphical user interface, at least one category of pre-existing recording to be retrieved;
retrieving, from the at least one music messaging software-as-a-service platform, at least one pre-existing recording, said pre-existing recording associated with the at least one selected category;
selecting, via the graphical user interface, a desired lyric phrase from within a preexisting recording;
communicating the selection of the desired lyric phrase to the at least one music messaging software-as-a-service platform in the form of non-audio data identifying a lyric phrase from an audio recording, the at least one music messaging software-as-a-service platform comprising an audio extraction engine that (i) receives the non-audio data identifying the lyric phrase together with an instance of the audio recording, (ii) identifies a portion of the audio recording where the lyric phrase is likely to be found at least in part by mapping each word in the lyric phrase to one and only vocal interval determined to exist in the audio recording, (iii) extracts the portion of the audio recording into a short snippet; and (iv) writes the short snippet into a database; and
directing, the at least one music messaging software-as-a-service platform, via the graphical user interface, to generate, output, and deliver a music message note for the intended recipient, wherein the music message note is based on the short snippet.

17. An apparatus for providing music messaging comprising:
a processor;
a memory;
a music messaging service software platform stored in the memory and when executed by the processor perform operations comprising;
first program code that receives, from a sender, a set of first information, the set of first information including a message personalized for an intended recipient, together with non-audio data identifying a lyric phrase from an audio recording;

an audio extraction engine that (i) receives the non-audio data identifying the lyric phrase together with an instance of the audio recording, (ii) identifies a portion of the audio recording where the lyric phrase is likely to be found at least in part by mapping each word in the lyric phrase to exactly one vocal interval determined to exist in the audio recording, (iii) extracts the portion of the audio recording into a short snippet; and (iv) writes the short snippet into a database;

a message generator that combines a reference to the short snippet with the message to generate and output a music message note for the intended recipient;

second program code operative to control access to the short snippet to a recipient of a music message note having a user account, and prompting the intended recipient to log into or create a user account; and third program code operative to cause delivery of the short snippet in response to receipt of data indicating that the reference is selected by the intended recipient.

18. The music messaging software-as-a-service platform of claim 17, further comprising program code operative to debit a user account balance of the sender in response to receipt of data indicating that the reference is selected by the intended recipient.

19. The music messaging software-as-a-service platform of claim 17, further comprising program code operative to debit a user account balance of the sender in response to a first playback of the short snippet and operative to debit a user account balance of the recipient in response to a subsequent playback of the short snippet.

20. The music messaging software-as-a-service platform of claim 17, further comprising program code operative to limit the number of times the short snippet may be played by the intended recipient.

* * * * *